(12) United States Patent
Koneripalli et al.

(10) Patent No.: US 6,905,742 B2
(45) Date of Patent: Jun. 14, 2005

(54) POLYPROPYLENE CARD CONSTRUCTION

(75) Inventors: Nagraj Koneripalli, Woodbury, MN (US); Mark F. Schulz, Lake Elmo, MN (US); Lori P. Engle, Little Canada, MN (US); James M. Jonza, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/355,534

(22) Filed: Jan. 31, 2003

(65) Prior Publication Data

US 2003/0118794 A1 Jun. 26, 2003

Related U.S. Application Data

(62) Division of application No. 09/591,601, filed on Jun. 9, 2000, now Pat. No. 6,555,213.

(51) Int. Cl.$^7$ ................................................ B41M 5/00
(52) U.S. Cl. ................................ 428/32.23; 428/195.1; 428/914; 40/124.191; 353/DIG. 3
(58) Field of Search ............................. 428/913.3, 914, 428/195.1, 32.23, 195, 483, 109; 353/DIG. 3, 120; 40/124.191; 8/471

(56) References Cited

U.S. PATENT DOCUMENTS

| | | | |
|---|---|---|---|
| 4,048,271 A | 9/1977 | Kesting | 264/41 |
| 4,090,662 A | 5/1978 | Fayling | 235/493 |
| 4,247,498 A | 1/1981 | Castro | 264/41 |
| 4,371,582 A | 2/1983 | Sugiyama et al. | 428/341 |
| 4,384,047 A | 5/1983 | Benzinger et al. | 521/64 |
| 4,396,643 A | 8/1983 | Kuehn et al. | 427/160 |
| 4,419,388 A | 12/1983 | Sugiyama et al. | 427/288 |
| 4,429,015 A | 1/1984 | Sheptak | 428/201 |
| 4,442,172 A | 4/1984 | Oshima et al. | 428/342 |
| 4,451,582 A | 5/1984 | Denzinger et al. | 521/38 |
| 4,452,843 A | 6/1984 | Kaule et al. | 428/199 |
| 4,460,637 A | 7/1984 | Miyamoto et al. | 428/212 |
| 4,496,629 A | 1/1985 | Haruta et al. | 428/341 |
| 4,503,111 A | 3/1985 | Jaeger et al. | 428/195 |
| 4,539,256 A | 9/1985 | Shipman | 428/315.5 |
| 4,595,931 A | 6/1986 | Toganoh et al. | 346/1.1 |
| 4,613,441 A | 9/1986 | Kohno et al. | 210/500.36 |
| 4,630,891 A | 12/1986 | Li | 350/105 |
| 4,649,064 A | 3/1987 | Jones | 427/256 |
| 4,701,837 A | 10/1987 | Sakaki et al. | 346/135.1 |
| 4,726,989 A | 2/1988 | Mrozinski | 428/315.5 |
| 4,732,786 A | 3/1988 | Patterson et al. | 427/261 |
| 4,749,084 A | 6/1988 | Pereyra | 206/459 |
| 4,775,594 A | 10/1988 | Desjarlais | 428/421 |
| 4,781,985 A | 11/1988 | Desjarlais | 428/421 |
| 4,812,352 A | 3/1989 | Debe | 428/142 |
| 4,830,902 A | 5/1989 | Plantenga et al. | 428/207 |
| 4,833,172 A | 5/1989 | Schwarz et al. | 521/62 |
| 4,861,644 A | 8/1989 | Young et al. | 428/195 |
| 4,867,881 A | 9/1989 | Kinzer | 210/490 |
| 4,892,779 A | 1/1990 | Leatherman et al. | 428/220 |
| 4,900,620 A | 2/1990 | Tokita et al. | 428/330 |

(Continued)

FOREIGN PATENT DOCUMENTS

| | | |
|---|---|---|
| DE | 30 24 205 A1 | 1/1982 |
| EP | 0 233 703 A2 | 8/1987 |
| EP | 0 350 257 A1 | 1/1990 |

(Continued)

*Primary Examiner*—Merrick Dixon
(74) *Attorney, Agent, or Firm*—Yen Tong Florczak

(57) ABSTRACT

An image retaining card is disclosed. An image retaining card in accordance with the present invention may be utilized as an identification card, a driver's license, a passport, and the like. An image retaining card in accordance with the present invention comprises a substrate structure, a cover, and an image receptive material disposed between the substrate structure and the cover. The substrate structure comprises a substrate layer and a substrate tie layer.

18 Claims, 8 Drawing Sheets

U.S. PATENT DOCUMENTS

| | | | | |
|---|---|---|---|---|
| 4,923,848 A | * | 5/1990 | Akada et al. | 503/227 |
| 4,930,814 A | | 6/1990 | Nusmeier | 283/109 |
| 4,935,307 A | | 6/1990 | Iqbal et al. | 428/500 |
| 4,954,395 A | | 9/1990 | Hasegawa et al. | 428/318.4 |
| 4,966,804 A | | 10/1990 | Hasegawa et al. | 428/203 |
| 4,968,063 A | | 11/1990 | McConville et al. | 283/72 |
| 4,986,868 A | | 1/1991 | Schmidt | 156/249 |
| 5,027,131 A | | 6/1991 | Hasegawa et al. | 346/1.1 |
| 5,059,983 A | | 10/1991 | Higuma et al. | 346/1.1 |
| 5,060,981 A | | 10/1991 | Fossum et al. | 283/109 |
| 5,068,140 A | | 11/1991 | Malhotra et al. | 428/216 |
| 5,084,340 A | | 1/1992 | Light | 428/327 |
| 5,102,731 A | | 4/1992 | Takimoto et al. | 428/323 |
| 5,118,570 A | | 6/1992 | Malhotra | 428/474.4 |
| 5,120,594 A | | 6/1992 | Mrozinski | 428/195 |
| 5,126,195 A | | 6/1992 | Light | 428/327 |
| 5,134,198 A | | 7/1992 | Stofko, Jr. et al. | 525/205 |
| 5,139,598 A | | 8/1992 | Chou et al. | 156/234 |
| 5,141,797 A | | 8/1992 | Wheeler | 428/195 |
| 5,192,617 A | | 3/1993 | Stofko, Jr. et al. | 428/411.1 |
| 5,198,306 A | | 3/1993 | Kruse | 428/481 |
| 5,206,071 A | | 4/1993 | Atherton et al. | 428/195 |
| 5,208,092 A | | 5/1993 | Iqbal | 428/195 |
| 5,219,928 A | | 6/1993 | Stofko, Jr. et al. | 525/57 |
| 5,241,006 A | | 8/1993 | Iqbal et al. | 525/196 |
| 5,277,811 A | | 1/1994 | Moya | 210/500.3 |
| 5,302,436 A | | 4/1994 | Miller | 428/195 |
| 5,302,437 A | | 4/1994 | Idei et al. | 428/195 |
| 5,319,400 A | * | 6/1994 | Herbert et al. | 353/120 |
| 5,326,619 A | | 7/1994 | Dower et al. | 428/164 |
| 5,336,558 A | | 8/1994 | Debe | 428/323 |
| 5,342,688 A | | 8/1994 | Kitchin et al. | 428/402 |
| 5,370,763 A | | 12/1994 | Curiel | 156/277 |
| 5,374,475 A | | 12/1994 | Walchli | 428/304.4 |
| 5,376,727 A | | 12/1994 | Iqbal et al. | 525/196 |
| 5,380,044 A | | 1/1995 | Aitkens et al. | 283/67 |
| 5,389,723 A | | 2/1995 | Iqbal et al. | 525/57 |
| 5,407,893 A | | 4/1995 | Koshizuka et al. | 593/227 |
| 5,410,642 A | | 4/1995 | Hakamatsuka et al. | 395/113 |
| 5,422,178 A | | 6/1995 | Swenson et al. | 428/343 |
| 5,429,860 A | | 7/1995 | Held et al. | 428/195 |
| 5,435,599 A | | 7/1995 | Bernecker | 283/70 |
| 5,443,727 A | | 8/1995 | Gagnon | 210/490 |
| 5,462,708 A | | 10/1995 | Swenson et al. | 264/174.11 |
| 5,464,254 A | | 11/1995 | Campbell et al. | 283/109 |
| 5,472,789 A | | 12/1995 | Iqbal et al. | 428/483 |
| 5,534,320 A | | 7/1996 | Raby | 428/42.1 |
| 5,537,137 A | | 7/1996 | Held et al. | 347/105 |
| 5,545,280 A | | 8/1996 | Wenz | 156/234 |
| 5,569,529 A | | 10/1996 | Becker et al. | 428/331 |
| 5,589,259 A | | 12/1996 | Hosoi et al. | 428/323 |
| 5,591,527 A | | 1/1997 | Lu | 428/411.1 |
| 5,595,403 A | | 1/1997 | Garrison | 283/74 |
| 5,599,765 A | | 2/1997 | Ohshima et al. | 503/227 |
| 5,629,093 A | | 5/1997 | Bischof et al. | 428/411.1 |
| 5,658,411 A | | 8/1997 | Faykish | 156/233 |
| 5,660,919 A | | 8/1997 | Vallee et al. | 428/206 |
| 5,681,660 A | | 10/1997 | Bull et al. | 428/500 |
| 5,683,774 A | | 11/1997 | Faykish et al. | 428/40.1 |
| 5,686,602 A | | 11/1997 | Farooq et al. | 536/101 |
| 5,688,738 A | | 11/1997 | Lu | 503/227 |
| 5,707,722 A | | 1/1998 | Iqbal et al. | 428/304.4 |
| 5,710,588 A | | 1/1998 | Malhotra | 347/153 |
| 5,721,086 A | | 2/1998 | Emslander et al. | 430/126 |
| 5,747,148 A | | 5/1998 | Warner et al. | 428/212 |
| 5,756,188 A | | 5/1998 | Reiter et al. | 428/195 |
| 5,766,398 A | | 6/1998 | Cahill | 156/240 |
| 5,786,298 A | | 7/1998 | Tsou et al. | 503/227 |
| 5,795,425 A | | 8/1998 | Brault et al. | 156/235 |
| 5,807,461 A | | 9/1998 | Hagstrom | 156/361 |
| 5,811,493 A | | 9/1998 | Kent | 525/92 F |
| 5,830,561 A | | 11/1998 | Hagner | 428/195 |
| 5,837,351 A | | 11/1998 | Chernovitz et al. | 428/195 |
| 5,837,365 A | | 11/1998 | Chung | 428/318.8 |
| 5,837,375 A | | 11/1998 | Brault et al. | 428/411.1 |
| 5,846,647 A | | 12/1998 | Yoshino et al. | 428/328 |
| 5,858,514 A | | 1/1999 | Bowers | 428/195 |
| 5,874,145 A | | 2/1999 | Waller | 428/42.1 |
| 5,890,742 A | | 4/1999 | Waller | 283/67 |
| 5,928,789 A | | 7/1999 | Chen et al. | 428/413 |
| 5,939,469 A | | 8/1999 | Fussnegger et al. | 523/161 |
| 5,952,104 A | | 9/1999 | Sugiyama et al. | 428/409 |
| 5,958,564 A | | 9/1999 | Iwamoto et al. | 428/212 |
| 5,965,256 A | | 10/1999 | Barrera | 428/354 |
| 5,969,069 A | | 10/1999 | Su et al. | 526/318 |
| 5,976,671 A | | 11/1999 | Gleim | 428/172 |
| 6,001,482 A | | 12/1999 | Anderson et al. | 428/409 |
| 6,080,261 A | | 6/2000 | Popat et al. | 156/240 |
| 6,124,417 A | | 9/2000 | Su | 526/318 |
| 6,165,593 A | | 12/2000 | Brault et al. | 428/195 |
| 6,555,213 B1 | * | 4/2003 | Koneripalli et al. | 428/304.4 |
| 6,692,799 B2 | * | 2/2004 | Waller, Jr. | 428/32.23 |

FOREIGN PATENT DOCUMENTS

| | | |
|---|---|---|
| EP | 0 380 133 A1 | 1/1990 |
| EP | 0 484 016 A1 | 5/1992 |
| EP | 0 716 931 A1 | 6/1996 |
| EP | 0 718 384 A2 | 6/1996 |
| EP | 0 802 245 A1 | 10/1997 |
| EP | 0 832 756 B1 | 4/1998 |
| EP | 0 904 953 A1 | 3/1999 |
| JP | 61-41585 | 2/1986 |
| JP | 61-261089 | 11/1986 |
| JP | 11-296658 | 10/1999 |
| WO | WO 88/06532 | 9/1988 |
| WO | WO 92/07722 | 5/1992 |
| WO | WO 93/01938 | 2/1993 |
| WO | WO 95/06564 | 3/1995 |
| WO | WO 95/30547 | 11/1995 |
| WO | WO 97/07991 | 3/1997 |
| WO | WO 97/15457 | 5/1997 |
| WO | WO 98/05512 | 2/1998 |
| WO | WO 98/29516 | 7/1998 |
| WO | WO 99/10184 | 3/1999 |
| WO | WO 99/45375 | 9/1999 |
| WO | WO 99/55537 | 11/1999 |
| WO | WO 99/56682 | 11/1999 |
| WO | WO 00/00352 | 1/2000 |
| WO | WO 00/47421 | 8/2000 |

* cited by examiner

POLYPROPYLENE CARD CONSTRUCTION

CROSS REFERENCE TO RELATED APPLICATIONS

This application is a divisional of U.S. application Ser. No. 09/591,601, filed Jun. 9, 2000 now U.S. Pat. No. 6,555,213.

FIELD OF THE INVENTION

The present invention relates generally to image retaining cards. More particularly, the present invention relates to image retaining cards for such things as identification cards, a driver's licenses, passports, and the like.

BACKGROUND

Identification cards and related products have been used for many years as a means for persons to establish their identity and credentials. These identification cards are typically kept on the person of the card holder. For example, the card may be kept in the card holder's wallet. Identification cards are often utilized on a daily basis to obtain entrance into a controlled area. During daily use, the identification card may be flexed repeatedly. Even when inside a wallet, the identification card may be subjected to repeated flexing. Identification cards frequently develop cracks, and/or delaminate due to repeated flexing during use.

SUMMARY OF INVENTION

An image retaining card in accordance with the present invention may be utilized as an identification card, a driver's license, a passport, etc. An image retaining card in accordance with the present invention comprises a substrate structure, a cover, and an image receptive material disposed between the substrate structure and the cover. The substrate structure comprises a substrate layer and a preferred but optional substrate tie layer.

In a useful embodiment, the substrate layer of the substrate structure comprises a polyolefin. In a particularly useful embodiment, the substrate layer of the substrate structure comprises polypropylene. In a preferred method in accordance with the present invention, the substrate layer and the optional substrate tie layer are formed utilizing a co-extrusion process. In a particularly preferred embodiment, the substrate layer comprises a blend of materials including the tie layer material to enhance the adhesion between substrate tie layer and substrate layer.

An image retaining card including polypropylene exhibits good abrasion resistance, low cost, and good crack resistance. In a preferred embodiment, the substrate tie layer of the substrate structure comprises functionalized polyolefin. An image retaining card including a substrate tie layer comprising functionalized polyolefin exhibits good resistance to delamination.

In one embodiment, the image receptive material is comprised of a microporous polymeric film. An identification card comprising an image retaining card including a microporous polymeric film and an image printed on the microporous polymeric film exhibits desirable anti-tampering characteristics. In particular, if an image retaining card in accordance with the present invention is delaminated the printed image will be substantially distorted and/or destroyed. For example, during delamination, the image receptive material may stretch, distorting the image.

In a preferred embodiment, the image receptive material is adapted to receive an aqueous ink from an inkjet printer. Aqueous ink from an inkjet printer is preferred because inkjet printers are readily available at low cost.

In a preferred embodiment, the image retaining card includes a printed image having one or more security indicia. Examples of security indicia which may be suitable in some applications include, a picture of a human face, a representation of a human finger print, and a representation of a cardholder's signature.

In a preferred embodiment, the cover comprises an optically transparent polymeric film. An optically transparent polymeric film is preferred, so that the printed image may be viewed through the cover. Also in a preferred embodiment, the cover is fixed to the image receptive material, for example, by heat bonding. An image retaining card including a cover heat bonded to an image receptive material having a printed image disposed on its surface exhibits desirable anti-tampering characteristics. In particular, if the protective layer is separated from the image receptive material, the printed image will be substantially distorted and/or destroyed. For example, during delamination, a portion of the ink may adhere to the cover and a portion of the ink may adhere to the image receptive material, making image alteration difficult.

DETAILED DESCRIPTION OF THE PREFERRED EMBODIMENTS

The following detailed description should be read with reference to the drawings, in which like elements in different drawings are numbered in like fashion. The drawings which are highly diagrammatic, depict selected embodiments, and are not intended to limit the scope of the invention. Examples of constructions, materials, dimensions, and manufacturing processes are provided for various elements. Those skilled in the art will recognize that many of the examples provided have suitable alternatives which may be utilized.

Figure 1:
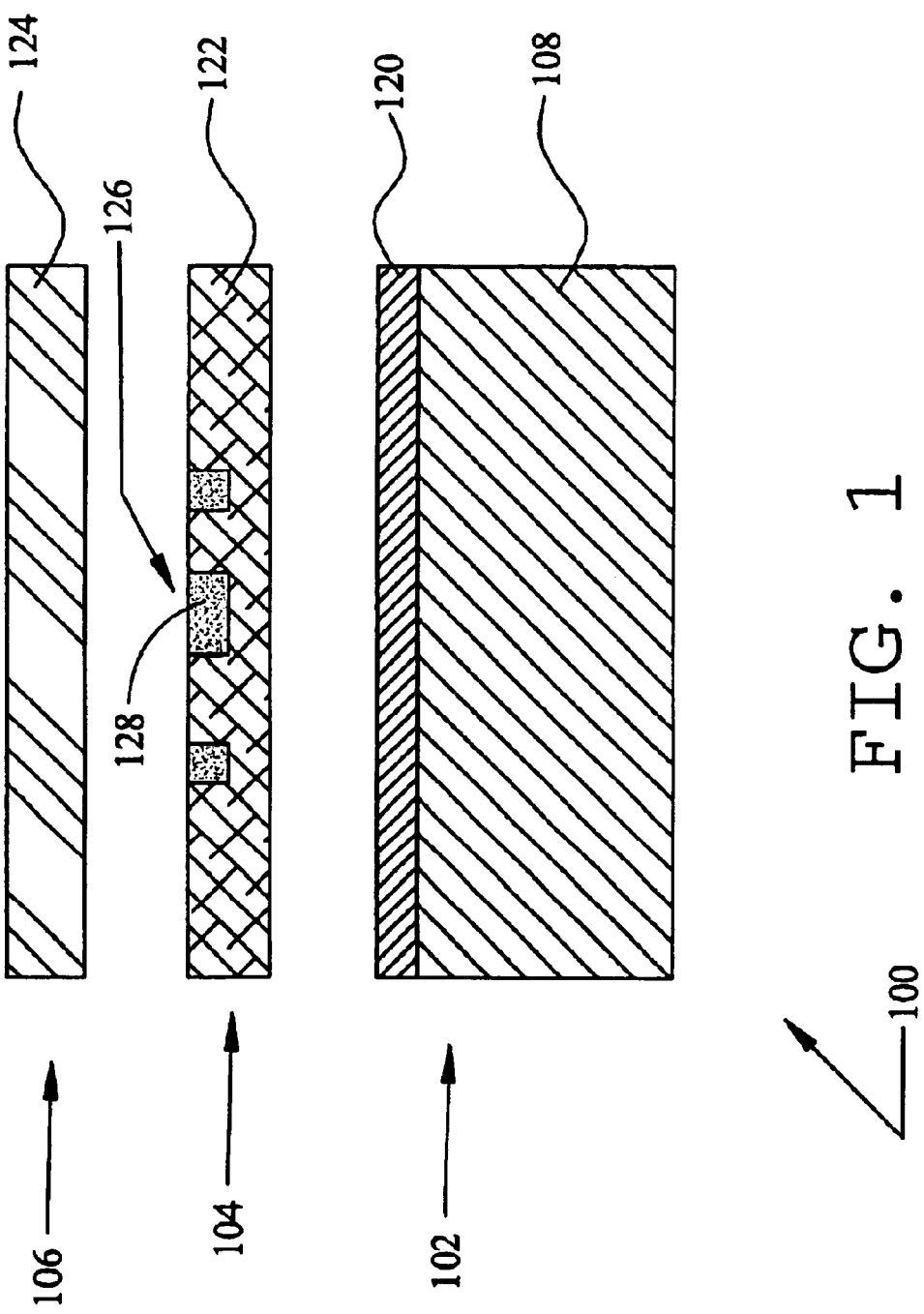
FIG. 1 is a partially exploded cross-sectional view of an image retaining card including a substrate structure and an image receptive material in accordance with the present invention.

FIG. 1 is a partially exploded cross-sectional view of an image retaining card 100 in accordance with the present invention. Image retaining card 100 comprises a substrate structure 102, an intermediate structure 104, and a cover 106. As shown in FIG. 1, intermediate structure 104 is disposed between substrate structure 102 and cover 106. In a preferred embodiment intermediate structure 104 is fixed to substrate structure 102 and cover 106. In a particularly preferred embodiment, intermediate structure 104 is heat bonded to substrate structure 102 and cover 106.

Substrate structure 102 comprises a substrate layer 108 and a substrate tie layer 120. Intermediate structure 104 comprises an image receptive material 122. As shown in FIG. 1, substrate tie layer 120 overlays substrate layer 108. Also as shown in FIG. 1, image receptive material 122 of intermediate structure 104 overlays substrate tie layer 120. Cover 106 comprises a protective material 124. In FIG. 1, it may be appreciated that protective material 124 of cover 106 overlays image receptive material 122.

A printed image 126 comprising an ink 128 is disposed proximate image receptive material 122. In a preferred embodiment, ink 128 comprises an aqueous ink 128. In a particularly preferred embodiment ink 128 comprises an aqueous ink 128 adapted for use in an inkjet printer.

Image retaining card 100 of FIG. 1 may comprise an identification card, a driver's license, a passport, etc. having a printed image 126. In a preferred embodiment, printed image 126 includes one or more security indicia. Examples of security indicia which may be suitable in some applications include, a picture of a human face, a representation of a human finger print, a bar code, and a representation of a cardholder's signature.

Substrate Layer

In a preferred embodiment, substrate layer 108 comprises a polyolefin material. In a preferred embodiment, substrate layer 108 comprises polypropylene. An image retaining card including a polyolefin substrate layer exhibits good abrasion resistance, and crack resistance.

Substrate layer 108 may include a filler. Examples of fillers which may be suitable in some applications include calcium carbonate, fumed silica, precipitated silica, alumina, alkyl quaternary ammonium bentonite, alkyl quaternary ammonium montmorillonite, clay, kaolin, talcum, titanium oxide, chalk, bentonite, aluminum silicate, calcium silicate, magnesium carbonate, calcium sulfate, barium sulfate, silicium oxide, barium carbonate, boehmite, pseudo boehmite, mica, glass fibers, polymeric fibers, graphite fibers, wollastonite, and the like.

In some cases it may be desirable to emboss substrate layer 108. In a useful embodiment the thickness of substrate layer 108 (prior to embossing) is, for example, between about 50 and about 2500 microns. In a preferred embodiment the thickness of substrate layer 108 (prior to embossing) is, for example, between about 150 and about 1500 microns. In a particularly preferred embodiment the thickness of substrate layer 108 (prior to embossing) is, for example, between about 500 and about 1000 microns. The particular thickness will depend upon the desired flexibility of the card and the desirability of placing microchips and other devices in substrate layer 108.

In a preferred embodiment, substrate layer 108 is fixed to substrate tie layer 120. In a particularly preferred embodiment, substrate layer 108 is fixed to substrate tie layer 120 during formation of the layers utilizing a co-extrusion process. Processes in accordance with the present invention produce a desirably strong bond between the substrate layer and the substrate tie layer. The bond strength between substrate tie layer 120 and substrate layer 108 may be increased by blending substrate tie layer material into substrate layer 108.

Substrate Tie Layer

In a preferred embodiment, substrate tie layer 120 is comprised of a functionalized polyolefin. An image retaining card including a substrate tie layer comprising functionalized polyolefin exhibits good resistance to delamination. Examples of functionalized olefins include anhydride modified polypropylene, acid modified polyolefins, and acid/anhydride modified polyolefins. Examples of commercially available materials which may be suitable in some applications include ELVAX 3175 ethylene vinyl acetate polymer, and BYNEL 3101 acid/acrylate-modified ethylene vinyl acetate polymer, ELVALOY 741 resin modifier, and FUSABOND polymeric coupling agent which are all commercially available from E.I. DuPont de Nemours and Company of Wilmington, Del.

Substrate tie layer 120 may be comprised of other materials without deviating from the spirit and scope of the present invention. Examples of materials which may be suitable in some applications include acid and/or acrylate modified ethylene vinyl acetate polymers (EVA), anhydride modified vinyl acetate polymers, and carbon monoxide modified ethylene vinyl acetate polymer.

In a preferred embodiment of the present invention, substrate tie layer 120 and substrate layer 108 are formed utilizing a co-extrusion process. In a particularly preferred embodiment, substrate layer 108 comprises a blend of materials including the tie layer material, to enhance the adhesion between substrate tie layer 120 and substrate layer 108.

Image Receptive Material

In a preferred embodiment, image receptive material 122 is comprised of an open-cell, microporous film. For example, a suitable film is one comprising essentially linear ultrahigh molecular weight polyethylene, filled with a finely divided particulate substantially water insoluble siliceous filler, having a weight ratio of the filler to polymer in the mixture of from about 1:1 to 9:1. Such films are described in U.S. Pat. No. 4,833,172. In a particularly preferred embodiment, image receptive material 122 is modified to be compatible with inkjet printing inks. Examples of commercially available materials which may be suitable in some applications include TESLIN which is commercially available from Pittsburgh Paint and Glass (PPG).

An identification card comprising an image retaining card including a microporous polymeric film and an image printed on the microporous polymeric film exhibits desirable anti-tampering characteristics. In particular, if an image retaining card in accordance with the present invention is delaminated the printed image will be substantially distorted and/or destroyed. For example, during delamination, the image receptive material may stretch, distorting the image.

Image receptive material 122 may be comprised of other materials without deviating from the spirit and scope of the present invention. Examples of materials which may be suitable in some applications include synthetic papers, and synthetic membranes. It is to be appreciated that image receptive material 122 may comprise woven or non-woven materials. It is also to be appreciated that image receptive material 122 may comprise synthetic or natural materials. Image receptive material 122 is preferably at least about 10 $\mu$m thick.

Printed Image

In FIG. 1, it may be appreciated that a printed image 126 is disposed proximate image receptive material 122. In a preferred embodiment, printed image 126 is comprised of ink. In a particularly preferred embodiment, printed image 126 is comprised of ink which is adapted to be applied to a substrate with an inkjet printer. Ink adapted for use in an inkjet printer is preferred because inkjet printers are readily available at low cost.

Ink in accordance with the present invention may include many components without deviating from the spirit and scope of the present invention. Examples of ink components which may be suitable in some applications include pigments, dyes, solvents, and binders. In a particularly preferred embodiment, printed image 126 is comprised of aqueous ink. Examples of solvents typically utilized in aqueous inks include water, ethylene glycol, diethylene glycol, and propylene glycol. It is to be appreciated that other fluids may be applied to image receptive material 122 without deviating from the spirit and scope of the present invention.

Printed image 126 may be fabricated utilizing many printing processes without deviating from the spirit and scope of the present invention. Examples of printing methods which may be suitable in some applications include inkjet printing, laser printing, flexographic printing, offset printing, electro-static printing, gravure printing, screen printing, valve jet, and spray jet.

A printed image in accordance with the present invention may include a security indicia or a plurality of security indicia. Examples of security indices include, a picture of a human face, a representation of a human finger print, a bar code, and a representation of the cardholders signature.

Cover

In a preferred embodiment, cover 106 comprises a protective material 124. Protective material 124 preferably comprises a substantially optically transparent polymeric film. Also in a preferred embodiment, protective material 124 comprises an ionomeric polymer. Particularly preferred ionomeric polymers are copolymers of ethylene with methacrylic acid. E.I. DuPont de Nemours Company produces a line of neutralized ethylene-co-methacrylic acid ionomeric polymers under the trade designation "SURLYN" that are acceptable for the present use. Protective material 124 may be comprised of other materials without deviating from the spirit and scope of the present invention. Examples of materials which may be suitable in some applications include polyvinyl chloride (PVC), polypropylene (PP), polyethylene (PE), acrylic, polyester, biaxially oriented polypropylene, and copolymers thereof.

In a preferred embodiment, protective material 124 is optically transparent so that printed image 126 may be viewed through protective material 124. Also in a preferred embodiment, protective material 124 is fixed to image receptive material 122. In a particularly preferred embodiment, protective material 124 is fixed to image receptive material 122 utilizing a heat and/or pressure bonding process.

An identification card comprising an image retaining card including a protective material 124 heat bonded to an image receptive material having a printed image disposed on its surface exhibits desirable anti-tampering characteristics. In particular, if the protective layer is separated from the image receptive material, the printed image will be substantially distorted and/or destroyed. For example, during delamination, a portion of the ink may adhere to the protective layer and a portion of the ink may adhere to the image receptive material, making image alteration difficult.

Additives

Substrate structure 102, intermediate structure 104, and cover 106 of image retaining card 100 may all include additives without deviating from the spirit and scope of the present invention. Examples of additives which may be suitable in some applications include dyes, colorants, pigments, fillers, lubricants, antioxidants, surface active agents, ultraviolet light stabilizers, viscosity modifiers, and the like. Examples of fillers which may be suitable in some applications include calcium carbonate, fumed silica, precipitated silica, alumina, alkyl quatenary ammonium bentonite, alkyl quaternary ammonium montmorillonite, clay, kaolin, talcum, titanium oxide, chalk, bentonite, aluminum silicate, calcium silicate, magnesium carbonate, calcium sulfate, barium sulfate, silicium oxide, barium carbonate, boehmite, pseudo boehmite, mica, glass fibers, polymeric fibers, graphite fibers, wollastonite, melt additives, adhesion promoters, and the like.

Figure 2:
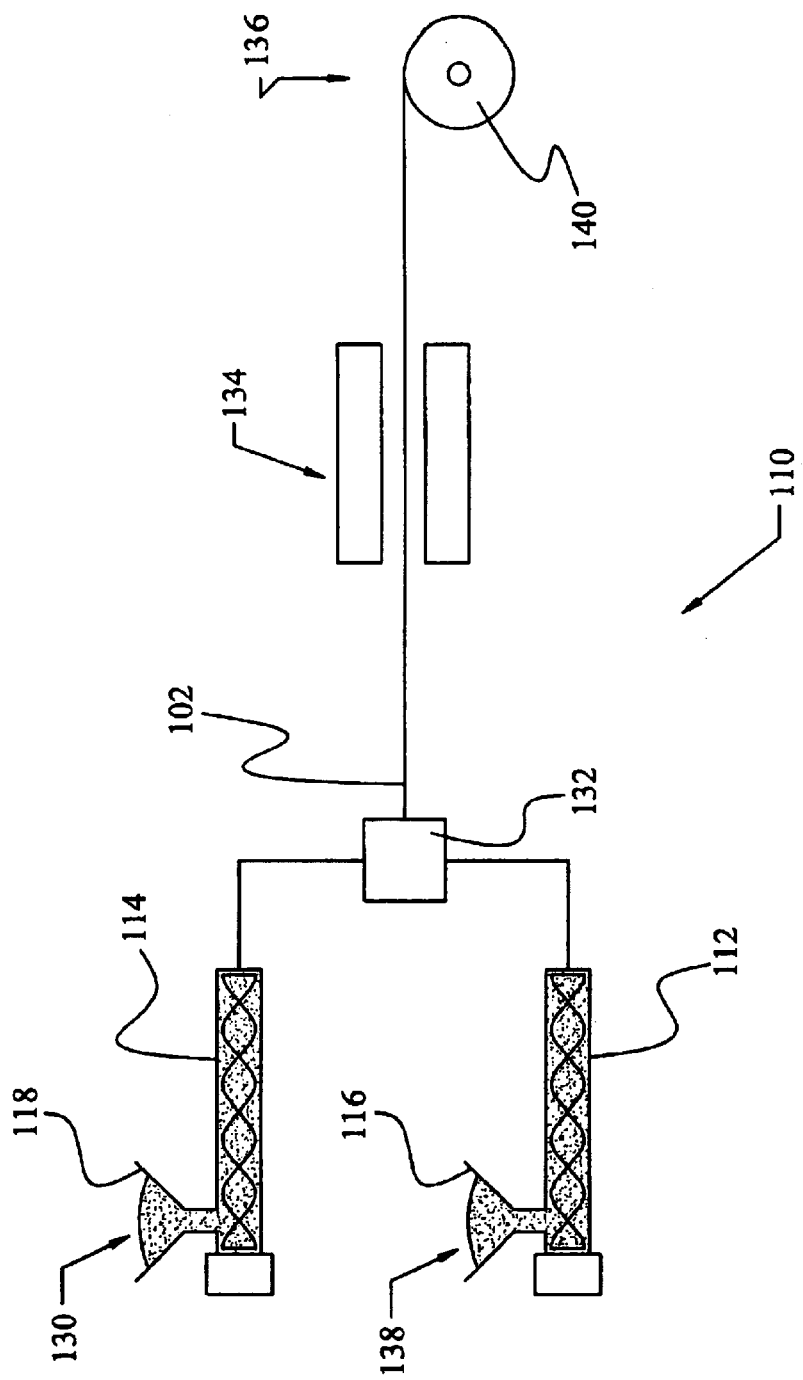
FIG. 2 is a diagrammatic representation of a method in accordance with the present invention which may be utilized to fabricate the substrate structure of the image retaining card of FIG. 1.

FIG. 2 is a diagrammatic representation of a method in accordance with the present invention which may be utilized to fabricate substrate structure 102 of image retaining card 100 of FIG. 1. FIG. 2 illustrates a co-extrusion system 110 including a first extruder 112 and a second extruder 114. First extruder 112 has a first material hopper 116 holding a substrate layer material 138. Likewise, second extruder 114 has a second material hopper 118 holding a substrate tie layer material 130.

A method of co-extruding substrate structure 102 may include the step of placing substrate layer material 138 into first material hopper 116 of first extruder 112. A method of co-extruding an substrate structure 102 may include the step of placing substrate tie layer material 130 into second material hopper 118 of second extruder 114. Substrate layer material 138 and substrate tie layer material 130 are urged through a co-extrusion head 132 utilizing first extruder 112 and second extruder 114, respectively to form substrate structure 102. Processes in accordance with the present invention produce a desirably strong bond between substrate layer material 138 and substrate tie layer material 130.

In FIG. 2, substrate structure 102 is shown exiting co-extrusion head 132 and passing through a cooling station 134. A rewind station 136 is also illustrated in FIG. 2. In the method illustrated in FIG. 2, rewind station 136 is utilized to wind substrate structure 102 forming a roll 140. Other process steps may be preformed on substrate structure 102 prior to winding. Examples of process steps which may be suitable in some applications include annealing, quenching, corona treating, flame treating, plasma treating, stretching, aligning, and the like.

Figure 3:
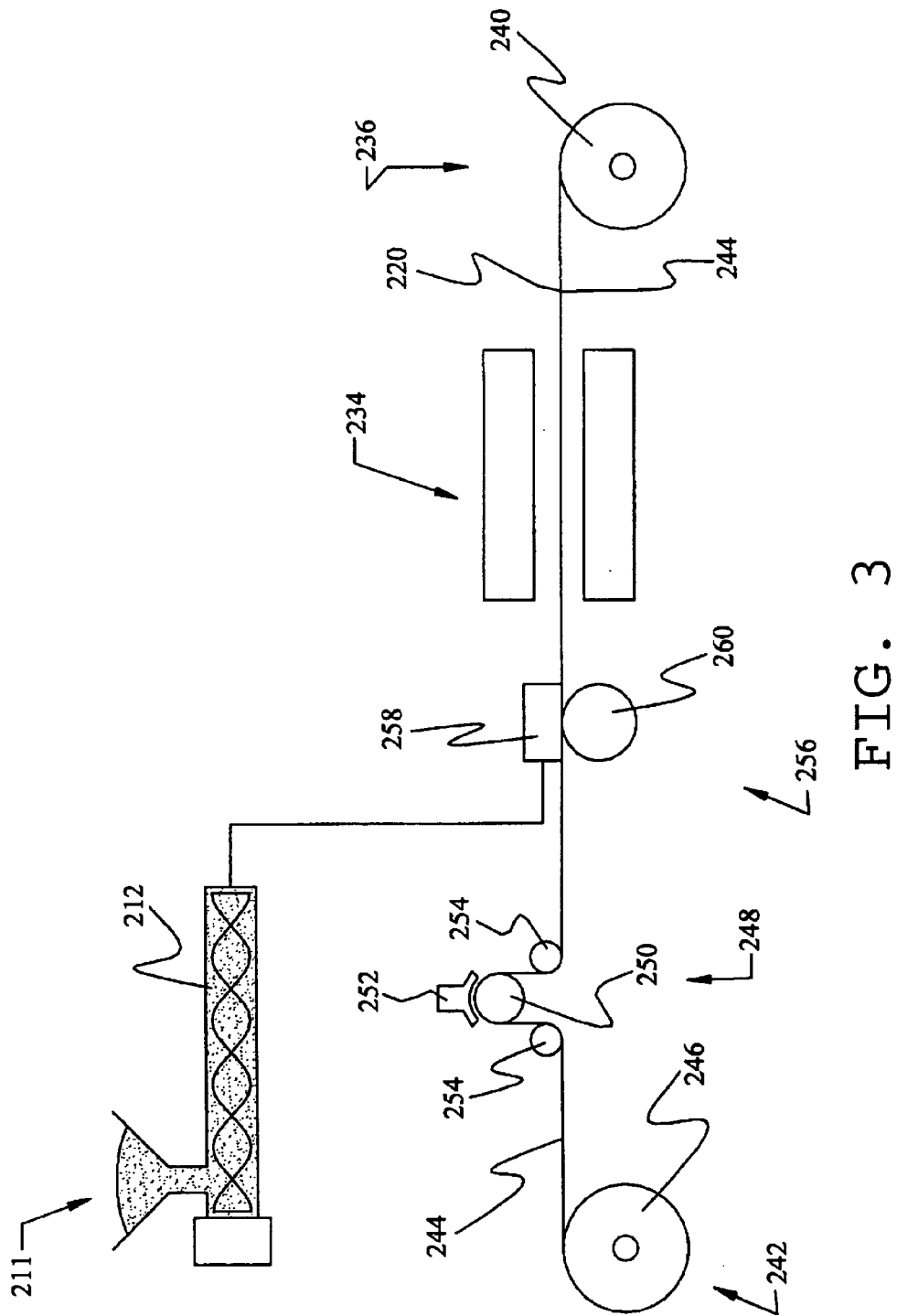
FIG. 3 is a diagrammatic representation of an additional method in accordance with the present invention which may be utilized to fabricate the substrate structure of the image retaining card of FIG. 1.

FIG. 3 is a diagrammatic representation of an additional method in accordance with the present invention which may be utilized to fabricate substrate structure 102 of image retaining card 100 of FIG. 1. In FIG. 3, a first unwind station 242 is illustrated. First unwind station 242 includes a first roll 246 comprising a plurality of turns of a substrate web 244. In a preferred embodiment, substrate web 244 comprises the same material as substrate layer 108 of FIG. 1.

As shown in FIG. 3, substrate web 244 is unwound from first roll 246 and passes through a first corona treating station 248. In the embodiment of FIG. 3, first corona treating station 248 includes a treatment roller 250, an electrode assembly 252, and a plurality of guide rollers 254. Subjecting a substrate web 244 to corona treatment prior to coating desirably increases the adhesion of the coated layer to substrate web 244. Equipment suitable for corona treating a material is commercially available from Enercon Industries Corporation of Menomonee Falls, Wis., Pillar Technologies of Hartland, Wis., and Corotec Corporation of Farmington, Conn. Other surface treatment methods may be utilized without deviating from the spirit and scope of the present invention. Examples of surface treatment methods include plasma treating, chemical treating, and flame treating. Equipment suitable for flame treating a material is commercially available from Flynn Burner Corporation of New Rochelle, N.Y. Plasma treating typically involves exposing the material to a charged gaseous atmosphere.

After passing through first corona treatment station 248, substrate web 244 enters a first coating station 256. In the embodiment of FIG. 3, first coating station 256 comprises a coating die 258, a backing roller 260, and an extruder 212 having a tie material 211 disposed therein. First coating station 256 applies a substrate tie layer 220 to substrate web 244 forming a substrate structure 102.

In FIG. 3, substrate structure 102 is shown exiting first coating station 256 and passing through a cooling station 234. A rewind station 236 is also illustrated in FIG. 3. In the method illustrated in FIG. 3, rewind station 236 is utilized to wind substrate structure 102 forming a roll 240. Other process steps may be preformed on substrate structure 102 prior to winding.

Figure 4:
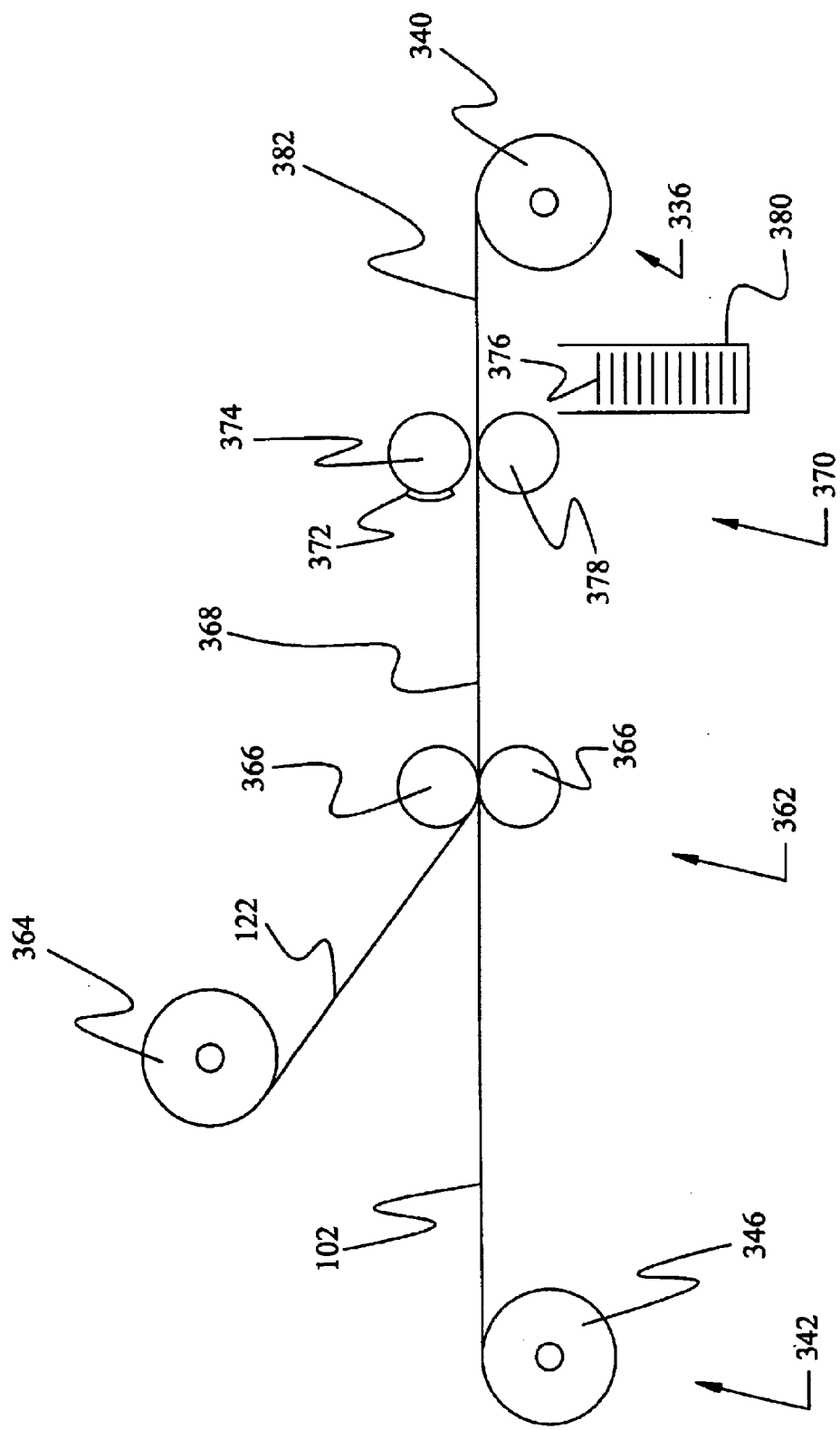
FIG. 4 is a diagrammatic representation of a method in accordance with the present invention which may be utilized to assemble the substrate structure and the image receptive material of the image retaining card of FIG. 1.

FIG. 4 is a diagrammatic representation of a method in accordance with the present invention. The method of FIG. 4 may be utilized to assemble substrate structure 102 and image receptive material 122 of image retaining card 100 of FIG. 1. In FIG. 4, a first unwind station 342 is illustrated. First unwind station 342 includes a first roll 346 comprising a plurality of turns of substrate structure 102.

As shown in FIG. 4, substrate structure 102 is unwound from first roll 346 and enters a laminating station 362. A second unwind station 364 feeds image receptive material 122 into laminating station 362. In the embodiment of FIG. 4, laminating station 362 includes a plurality of laminating rollers 366. In a preferred embodiment, laminating rollers 366 are adapted to apply heat and pressure to substrate structure 102 and image receptive material 122. In a preferred method in accordance with the present invention, image receptive material 122 is heat bonded to substrate structure 102 to form a laminate 368.

In the embodiment of FIG. 4, laminate 368 exits laminating station 362 and enters a die cutting station 370. In the embodiment of FIG. 4, die cutting station 370 includes a cutting die 372 fixed to a cutting die cylinder 374, and an anvil cylinder 378. Cutting die 372 is adapted to cut card blanks 376 from laminate 368. In FIG. 4, a plurality of card blanks 376 are show disposed in a bin 380. A web weed 382 formed by the remainder of laminate 368 exits die cutting station and is wound onto a roll 340 of a rewind station 336.

Having thus described FIG. 1 through FIG. 4, methods in accordance with the present invention may now be described with reference thereto. It should be understood that steps may be omitted from each process and/or the order of the steps may be changed without deviating from the spirit or scope of the invention. It is anticipated that in some applications, two or more steps may be performed more or less simultaneously to promote efficiency.

A method of fabricating an image retaining card may begin with the step of providing a card blank and a card cover. An image may be printed onto the image receptive layer of the card blank. In a preferred method, the image is printed onto the image receptive layer of the card blank utilizing an inkjet printer.

A method in accordance with the present invention may include the step of laminating a cover over the image receptive layer of the card blank. The step of laminating a cover over the image receptive layer of the card blank may include the steps of laying the cover over the card blank, inserting the cover and the card blank into a protective sheath, and inserting the sheath into a laminator.

Figure 5:
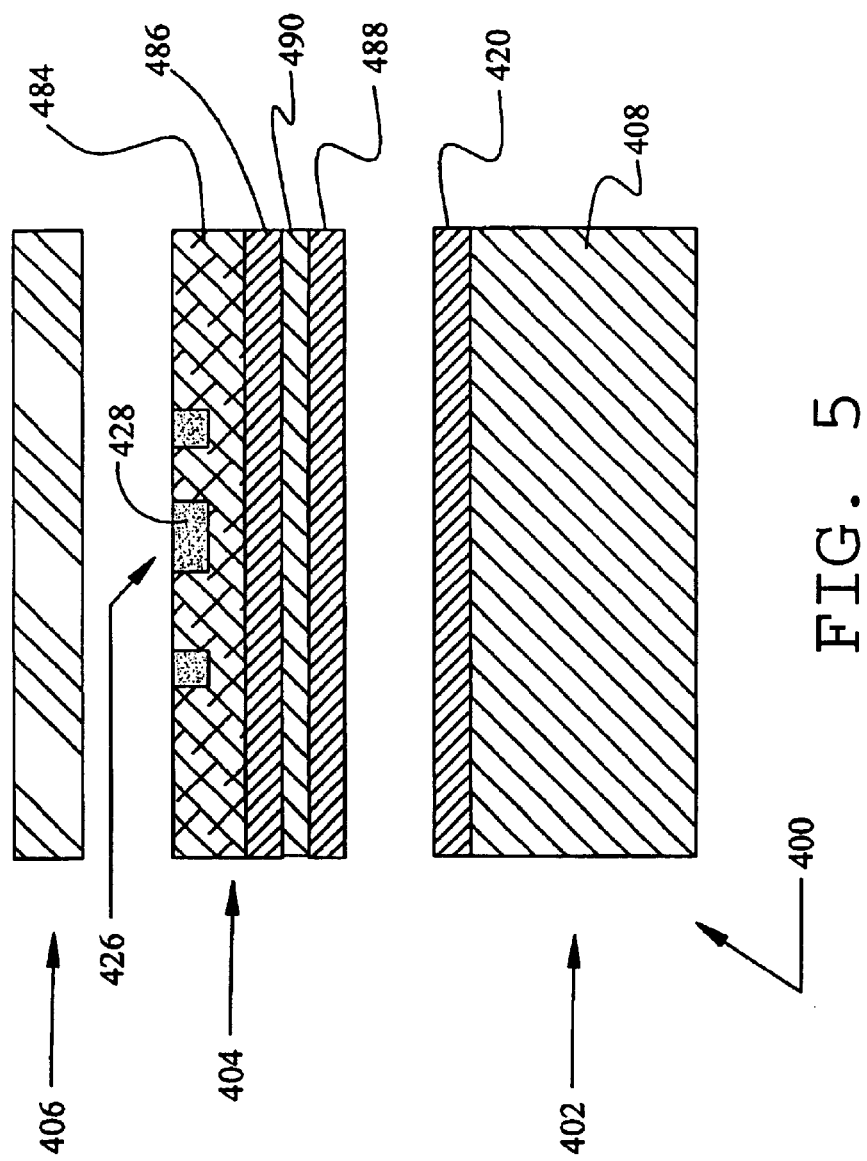
FIG. 5 is a partially exploded cross-sectional view of an additional embodiment of an image retaining card including an intermediate structure in accordance with the present invention.

FIG. 5 is a partially exploded cross-sectional view of an additional embodiment of an image retaining card 400 in accordance with the present invention. Image retaining card 400 comprises a substrate structure 402, an intermediate structure 404, and a cover 406. As shown in FIG. 5, intermediate structure 404 is disposed between substrate structure 402 and cover 406. In a preferred embodiment intermediate structure 404 is fixed to substrate structure 402 and cover 406. In a particularly preferred embodiment, intermediate structure 404 is heat bonded to substrate structure 402 and cover 406.

A printed image 426 comprising an ink 428 is disposed proximate an image receptive layer 484 of intermediate structure 404. In a preferred embodiment, ink 428 comprises an aqueous ink 428. In a particularly preferred embodiment ink 428 comprises an aqueous ink 428 adapted for use in an inkjet printer.

Image retaining card 400 of FIG. 5 may comprise an identification card, a driver's license, a passport, etc. having a printed image 426. In a preferred embodiment, printed image 426 includes one or more security indicia. Examples of security indicia which may be suitable in some applications include, a picture of a human face, a representation of a human finger print, and a representation of a cardholder's signature.

Intermediate Structure

In the embodiment of FIG. 5, intermediate structure 404 comprises an image receptive layer 484, a first tie layer 486, a backing layer 490, and a second tie layer 488. As shown in FIG. 5, first tie layer 486 is disposed between image receptive layer 484 and backing layer 490. In FIG. 5 it may also be appreciated that backing layer 490 is disposed between first tie layer 486 and second tie layer 488.

In a preferred embodiment, backing layer 490 comprises polyolefin. In a particularly preferred embodiment, backing layer 490 comprises polypropylene. Backing layer 490 may be comprised of other materials without deviating from the spirit and scope of the present invention. Examples of materials which may be suitable in some applications acrylic, polyester, and copolymers thereof.

In a preferred embodiment, first tie layer 486 and second tie layer 488 of intermediate structure 404 are comprised of a functionalized polyolefin. Examples of functionalized olefins include anhydride modified polypropylene, acid modified polyolefins, and acid and anhydride modified polyolefins.

First tie layer 486 and second tie layer 488 comprise of other materials without deviating from the spirit and scope of the present invention. Examples of materials which may be suitable in some applications include acid and/or acrylate modified ethylene vinyl acetate polymers (EVA), anhydride modified vinyl acetate polymers, and carbon monoxide modified ethylene vinyl acetate polymer. Examples of commercially available materials which may be suitable in some applications include ELVAX 3175 ethylene vinyl acetate polymer, and BYNEL 3101 acid/acrylate-modified ethylene vinyl acetate polymer, ELVALOY 741 resin modifier, and FUSABOND polymeric coupling agent which are all commercially available from E.I. DuPont de Nemours and Company of Wilmington, Del.

In a preferred embodiment, image receptive layer 484 is comprised of an open-cell, microporous film. For example, a suitable film is one comprising essentially linear ultrahigh molecular weight polyethylene, filled with a finely divided particulate substantially water insoluble siliceous filler, having a weight ratio of the filler to polymer in the mixture of from about 1:1 to 9:1. Such films are described in U.S. Pat. No. 4,833,172. In a particularly preferred embodiment, image receptive layer 484 is modified to be compatible with inkjet printing inks. Examples of commercially available materials which may be suitable in some applications include TESLIN which is commercially available from Pittsburgh Paint and Glass (PPG).

An identification card comprising an image retaining card including open-cell microporous film and an image printed on the open-cell microporous film exhibits desirable anti-tampering characteristics. In particular, if an image retaining card in accordance with the present invention is delaminated the printed image will be substantially distorted and/or destroyed. For example, during delamination, the image receptive layer may stretch, distorting the image. Image receptive layer 484 may be comprised of other materials without deviating from the spirit and scope of the present invention.

Printed Image

In FIG. 5, a printed image 426 is disposed proximate image receptive layer 484 of intermediate structure 404. In a preferred embodiment, printed image 426 is comprised of ink. In a particularly preferred embodiment, printed image 426 is comprised of ink which is adapted to be applied to a substrate with an inkjet printer. Ink adapted for use in an inkjet printer is preferred because inkjet printers are readily available at low cost.

Printed image 426 may be fabricated utilizing many printing processes without deviating from the spirit and scope of the present invention. A printed image in accordance with the present invention may include a security indice or a plurality of security indicia. Examples of security indices include, a picture of a human face, a representation of a human finger print, and a representation of the card-holders signature.

Substrate Structure

Substrate structure 402 of image retaining card 400 comprises a substrate layer 408 and a substrate tie layer 420. In a preferred embodiment, substrate layer 408 is comprised of polypropylene. An image retaining card including polypropylene exhibits good abrasion resistance, and crack resistance. Substrate layer 408 may be comprised of other materials without deviating from the spirit and scope of the present invention.

In a preferred embodiment, substrate layer 408 is fixed to substrate tie layer 420. In a particularly preferred embodiment, substrate layer 408 comprises a blend of materials including the tie layer material, to enhance the adhesion between substrate tie layer 420 and substrate layer 408. In a preferred method in accordance with the present invention, substrate layer 408 is fixed to substrate tie layer 420 during formation of the layers utilizing a co-extrusion process. During the co-extrusion process, blending may occur between the material of the substrate layer and the material of the substrate tie layer. Processes in accordance with the present invention produce a desirably strong bond between the substrate layer and the substrate tie layer.

In a preferred embodiment, substrate tie layer 420 of substrate structure 402 is comprised of a functionalized polyolefin. An image retaining card including a substrate tie layer comprising functionalized polyolefin exhibits good resistance to delamination. Examples of functionalized olefins include anhydride modified polypropylene, acid modified polyolefins, and acid/anhydride modified polyolefins. Examples of commercially available materials which may be suitable in some applications include ELVAX 3175 ethylene vinyl acetate polymer, and BYNEL 3101 acid/acrylate-modified ethylene vinyl acetate polymer, ELVALOY 741 resin modifier, and FUSABOND polymeric coupling agent which are all commercially available from E.I. DuPont de Nemours and Company of Wilmington, Del.

In a presently preferred embodiment of the present invention, substrate tie layer 420 and substrate layer 408 are formed utilizing a co-extrusion process. Substrate tie layer 420 may be comprised of other materials without deviating from the spirit and scope of the present invention.

Cover

In a preferred embodiment, cover 406 comprises a substantially optically transparent polymeric film. Also in a preferred embodiment, cover 406 comprises an ionomeric polymer. Particularly preferred ionomeric polymers are copolymers of ethylene with methacrylic acid. E.I. DuPont de Nemours Company produces a line of neutralized ethylene-co-methacrylic acid ionomeric polymers under the trade designation "SURLYN" that are acceptable for the present use. Cover 406 may comprise other materials without deviating from the spirit and scope of the present invention. Examples of materials which may be suitable in some applications include polyvinyl chloride (PVC), polypropylene (PP), polyethylene (PE), acrylic, polyester, biaxially oriented polypropylene, and copolymers and/or blends thereof.

In a preferred embodiment, cover 406 is optically transparent so that printed image 426 may be viewed through cover 406. Also in a preferred embodiment, cover 406 is fixed to image receptive layer 484. In a particularly preferred embodiment, cover 406 is fixed to image receptive layer 484 utilizing a heat and/or pressure bonding process.

An identification card comprising an image retaining card including a cover 406 heat bonded to an image receptive layer having a printed image disposed on its surface exhibits desirable anti-tampering characteristics. In particular, if the cover is separated from the image receptive layer, the printed image will be substantially distorted and/or destroyed. For example, during delamination, a portion of the ink may adhere to the cover and a portion of the ink may adhere to the image receptive layer.

Figure 6:
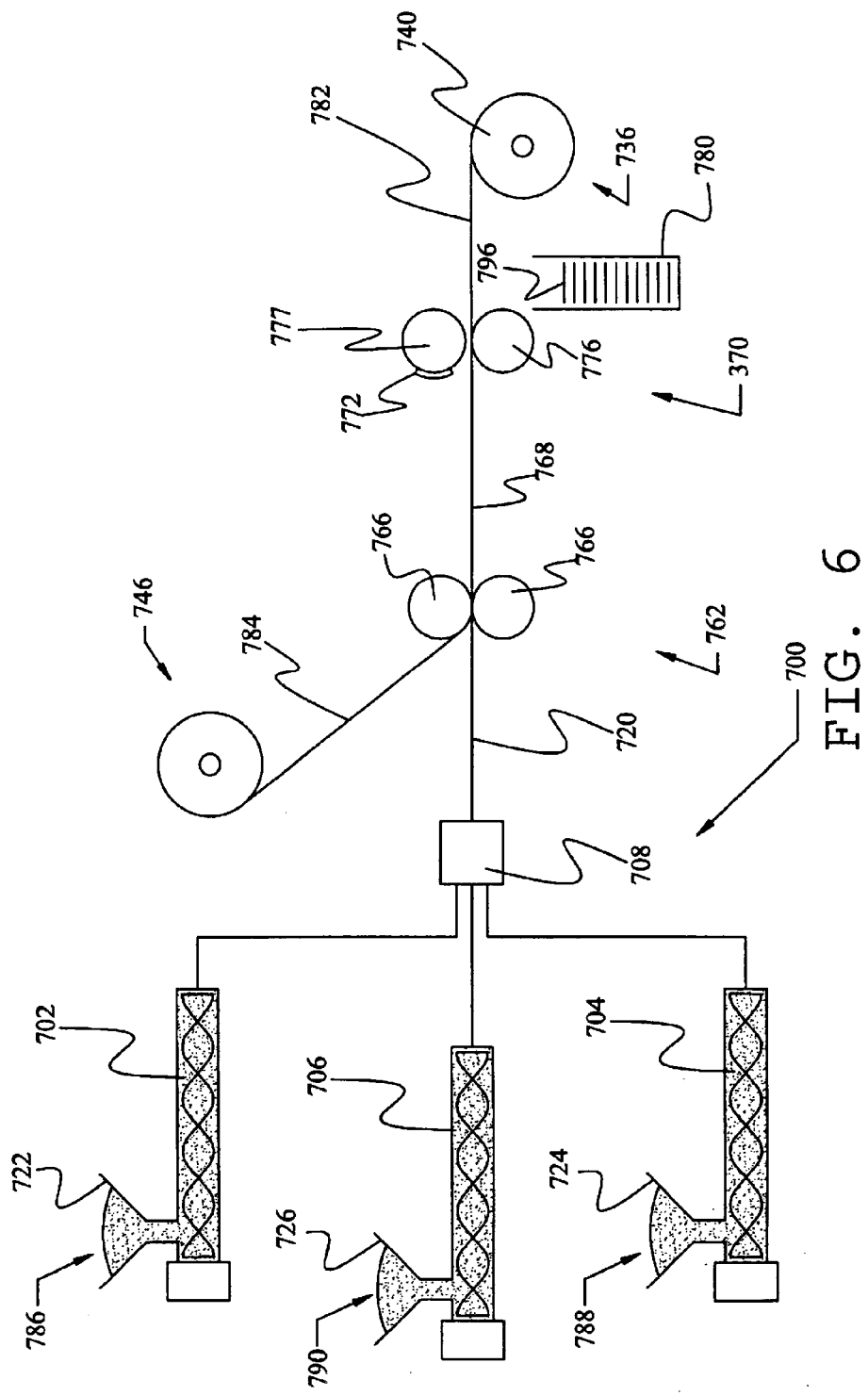
FIG. 6 is a diagrammatic representation of a method of fabricating the intermediate structure of the image retaining card of FIG. 5.

FIG. 6 is a diagrammatic representation of a method of fabricating intermediate structure 404 of image retaining card 400 of FIG. 5. FIG. 6 illustrates a co-extrusion system 700 including a first extruder 702, a second extruder 704, and a third extruder 706. First extruder 702 has a first material hopper 722 holding a first tie layer material 786. Likewise, second extruder 704 has a second material hopper 724 holding a second tie layer material 788. Third extruder 706 has a third material hopper 726 holding a backing layer material 790.

In the embodiment of FIG. 6, first extruder 702, second extruder 704, and third extruder 706 are all coupled to a co-extrusion head 708. A multi-layered extrudate 720 is shown exiting co-extrusion head 708. Multi-layered extrudate 720 comprises first tie layer 486, second tie layer 488, and backing layer 490. In a preferred embodiment, first tie layer 486 and second tie layer 488 are comprised of the same material. In this preferred embodiment a single extruder may be utilized to supply co-extrusion head 708 with tie layer material.

Multi-layered extrudate 720 exits co-extrusion head 708 and enters a laminating station 762. In the embodiment of FIG. 6, laminating station 762 includes a plurality of laminating rollers 766. A first unwind station 746 feeds an image receptive material 784 into laminating station 762. In a preferred embodiment, laminating rollers 766 are adapted to apply heat and pressure to image receptive material 784. In a preferred method in accordance with the present invention, laminating station 762 is adapted to heat bond image receptive material 784 to first tie layer 486 forming a laminate 768.

In the embodiment of FIG. 6, laminate 768 exits laminating station 762 and enters a die cutting station 770. In the embodiment of FIG. 6, die cutting station 770 includes a cutting die 772 fixed to a cutting die cylinder 777, and an anvil cylinder 776. Cutting die 772 is adapted to cut intermediate structure blanks 796 from laminate 768. In FIG. 6, a plurality of intermediate structure blanks 796 are show disposed in a bin 780. A web weed 782 formed by the remainder of laminate 768 exits die cutting station 770 and is wound onto a roll 740 of a rewind station 736.

Figure 7:
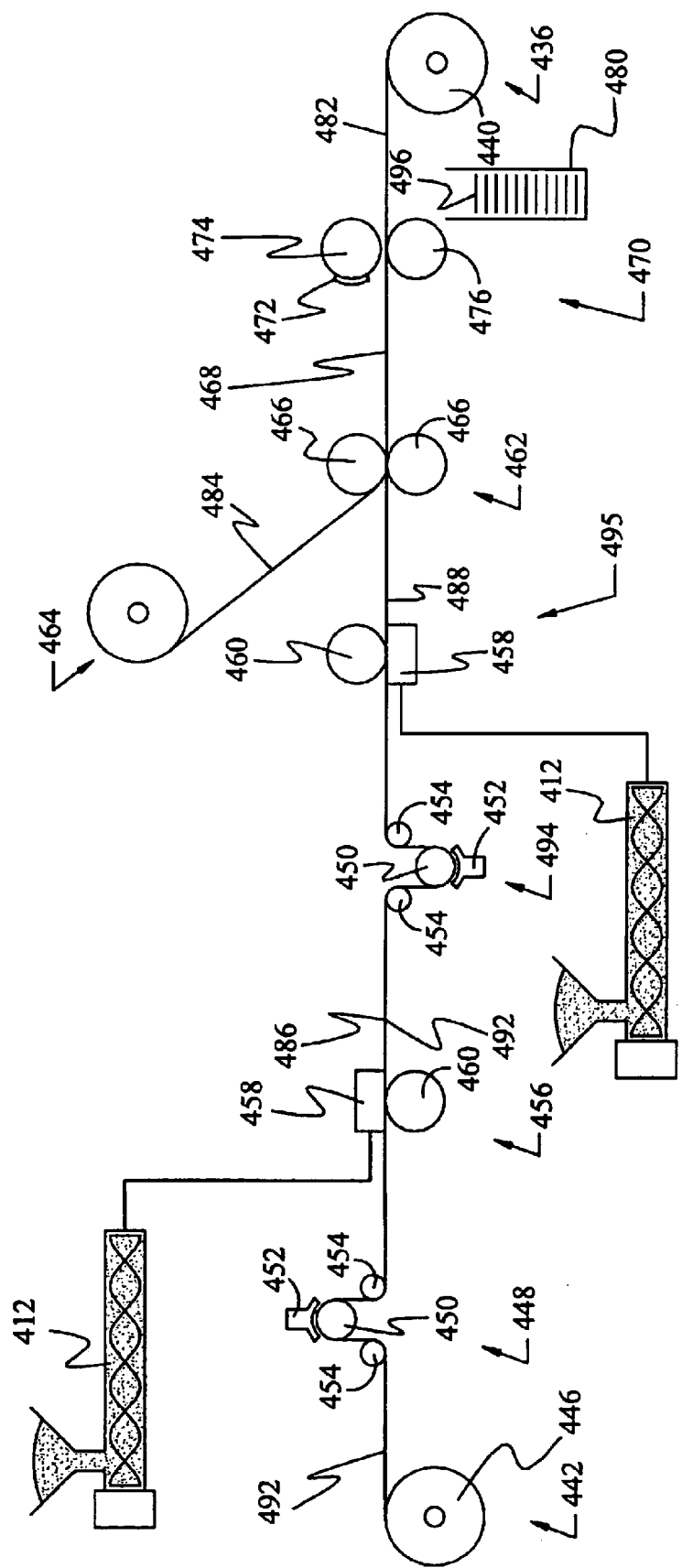
FIG. 7 is a diagrammatic representation of an additional method of fabricating the intermediate structure of the image retaining card of FIG. 5.

FIG. 7 is a diagrammatic representation of an additional method which may be utilized to fabricate intermediate structure 404 of image retaining card 400 of FIG. 5. In FIG. 7, a first unwind station 442 is illustrated. First unwind station 442 includes a first roll 446 comprising a plurality of turns of a backing layer web 492. In a preferred embodiment, backing layer web 492 comprises the same material as backing layer 490 of FIG. 5.

As shown in FIG. 7, backing layer web 492 is unwound from first roll 446 and passes through a first corona treating station 448. In the embodiment of FIG. 7, first corona treating station 448 includes a treatment roller 450, an electrode assembly 452, and a plurality of guide rollers 454. Subjecting a backing layer web 492 to corona treatment prior to coating desirably increases the adhesion of the coated layer to substrate web 444. Equipment suitable for corona treating a material is commercially available from Enercon Industries Corporation of Menomonee Falls, Wis., Pillar Technologies of Hartland, Wis., and Corotec Corporation of Farmington, Conn. Other surface treatment methods may be utilized without deviating from the spirit and scope of the present invention. Examples of surface treatment methods include plasma treating, chemical treating, and flame treating. Equipment suitable for flame treating a material is commercially available from Flynn Burner Corporation of New Rochelle, N.Y. Plasma treating typically involves exposing the material to a charged gaseous atmosphere.

After passing through first corona treatment station 448, backing layer web 492 enters a first coating station 456. In the embodiment of FIG. 7, first coating station 456 comprises a coating die 458, an extruder 412, and a backing roller 460. First coating station 456 applies a first tie layer 486 to backing layer web 492.

Backing layer web 492 exits first coating station 456 and enters a second corona treating station 494. Second corona treating station 494 includes a treatment roller 450, an electrode assembly 452, and a plurality of guide rollers 454. Second corona treating station 494 is adapted to treat a bottom surface of backing layer web 492.

Upon exiting second corona treating station 494, backing layer web 492 enters a second coating station 495 comprising a coating die 458, an extruder 412, and a backing roller 460. Second coating station 495 applies a second tie layer 488 to backing layer web 492.

After passing through second coating station 495, backing layer web 492 enters a laminating station 462. In the embodiment of FIG. 7, laminating station 462 includes a plurality of laminating rollers 466. A second unwind station 464 feeds an image receptive layer 484 into laminating station 462. In a preferred embodiment, laminating rollers 466 are adapted to apply heat and pressure to backing layer web 492 and image receptive layer 484. In a preferred method in accordance with the present invention, laminating station 462 is adapted to heat bond image receptive layer 484 to first tie layer and backing layer web 492 forming a laminate 468.

Laminate 468 enters a die cutting station 470. In the embodiment of FIG. 7, die cutting station 470 includes a cutting die 472 fixed to a cutting die cylinder 474, and an anvil cylinder 476. Cutting die 472 is adapted to cut intermediate structure blanks 496 from laminate 468. In FIG. 7, a plurality of intermediate structure blanks 496 are show disposed in a bin 480. A web weed 482 formed by the remainder of laminate 468 exits die cutting station 470 and is wound onto a roll 440 of a rewind station 436.

Having thus described FIG. 5, FIG. 6, and FIG. 7, methods in accordance with the present invention may now be described with reference thereto. It should be understood that steps may be omitted from each process and/or the order of the steps may be changed without deviating from the spirit or scope of the invention. It is anticipated that in some applications, two or more steps may be performed more or less simultaneously to promote efficiency.

A method of fabricating an image retaining card may begin with the step of providing an intermediate structure blank, a substrate blank, and a card cover. An image may then be printed onto the image receptive layer of the intermediate structure blank. In a preferred method, the image is printed onto the image receptive layer of the intermediate structure blank utilizing an inkjet printer.

A method in accordance with the present invention may include the step of laminating a cover over the image receptive layer of the intermediate structure. A method in accordance with the present invention may also include the step of laminating a substrate to a second side of the intermediate structure. The step of laminating may include the steps of assembling a stack of card components, inserting the stack into a protective sheath, and inserting the sheath into a laminator.

Figure 8:
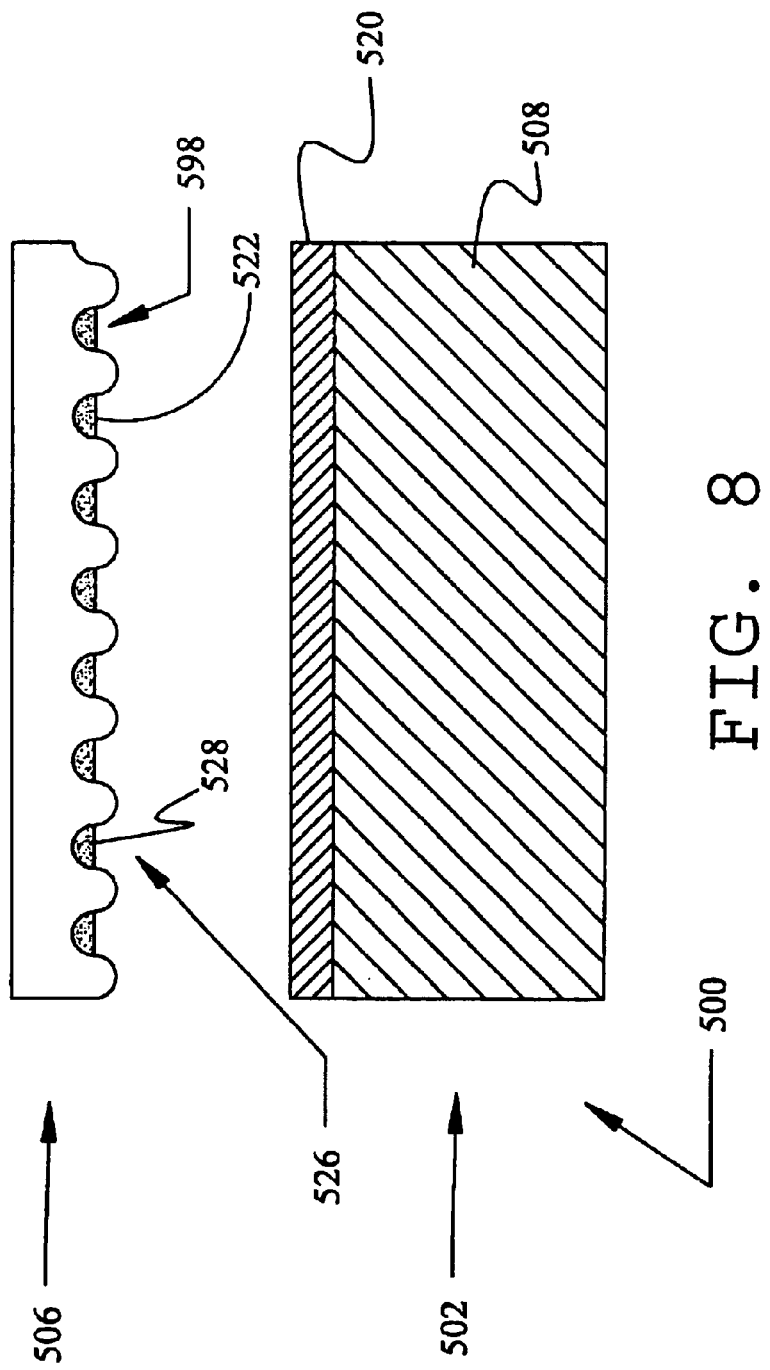
FIG. 8 is a partially exploded cross-sectional view of an additional embodiment of an image retaining card in accordance with the present invention.

FIG. 8 is a partially exploded cross-sectional view of an additional embodiment of an image retaining card 500 in accordance with the present invention. Image retaining card 500 comprises a substrate structure 502, and an image receptive cover 506. In a preferred embodiment image receptive cover 506 is fixed to substrate structure 502. In a particularly preferred embodiment, image receptive cover 506 is heat bonded to substrate structure 502.

Image receptive cover 506 includes a plurality of recesses 598. An image receptive material 522 is disposed within recesses 598 of image receptive cover 506. A printed image 526 comprising an ink 528 is disposed proximate an image receptive material 522. In a preferred embodiment, ink 528 comprises an aqueous ink 528. In a particularly preferred embodiment ink 528 comprises an aqueous ink 528 adapted for use in an inkjet printer.

In a preferred embodiment, image receptive material 522 is adapted to receive an image comprised of aqueous ink. It should be appreciated that image receptive material 522 may comprise many materials without deviating from the spirit and scope of the present invention. Examples of materials which may be suitable in some applications include alumina, silica, hydrophilic organic particles, and cellulose polymers. Examples of cellulose polymers include hydroxymethyl cellulose. Examples of commercially available cellulose polymers include METHOCEL, which is commercially available from Dow Chemical Corporation.

Suitable hydrophilic organic particles comprise crosslinked homopolymers and copolymers of N-vinyllactams such as homopolymers and copolymers of N-vinylpyrrolidone and homopolymers and copolymers of N-vinylcaprolactam, homopolymers and copolymers of N-vinylimidazoles, homopolymers and copolymers of vinylpyridine, and substituted derivatives thereof. Homopolymers and copolymers of N-vinyllactams and N-vinylimidazoles are preferred. Crosslinked particles of poly(N-vinylpyrrolidone) and poly(N-vinylimidazole) are most preferred.

Image retaining card 500 of FIG. 8 may comprise an identification card, a driver's license, a passport, etc. having a printed image 526. In a preferred embodiment, printed image 526 includes one or more security indicia. Examples of security indicia which may be suitable in some applications include, a picture of a human face, a representation of a human finger print, and a representation of a cardholder's signature.

In a preferred embodiment, image receptive cover 506 comprises a substantially optically transparent polymeric film. Also in a preferred embodiment, image receptive cover 506 comprises an ionomeric polymer. Particularly preferred ionomeric polymers are copolymers of ethylene with methacrylic acid. E.I. DuPont de Nemours Company produces a line of neutralized ethylene-co-metbacrylic acid ionomeric polymers under the trade designation "SURLYN" that are acceptable for the present use. Image receptive cover 506 may comprise other materials without deviating from the spirit and scope of the present invention. Examples of materials which may be suitable in some applications include polyvinyl chloride (PVC), polypropylene (PP), polyethylene (PE), acrylic, polyester, biaxially oriented polypropylene, and copolyers thereof. Recesses 598 of image receptive cover 506 may be formed utilizing an embossing process.

Substrate structure 502 comprises a substrate layer 508 and a substrate tie layer 520. In a preferred embodiment, substrate layer 508 is comprised of polypropylene. An image retaining card including polypropylene exhibits good abrasion resistance, and crack resistance.

In a preferred embodiment, substrate tie layer 520 is comprised of a functionalized polyolefin. An image retaining card including a substrate tie layer comprising functionalized polyolefin exhibits good resistance to delamination. Examples of functionalized olefins include anhydride modified polypropylene, acid modified polyolefins, and acid/anhydride modified polyolefins. Examples of commercially available materials which may be suitable in some applications include ELVAX 3175 ethylene vinyl acetate polymer, and BYNEL 3101 acid/acrylate-modified ethylene vinyl acetate polymer, ELVALOY 741 resin modifier, and FUSABOND polymeric coupling agent which are all commercially available from E.I. DuPont de Nemours and Company of Wilmington, Del.

Having thus described FIG. 8, methods in accordance with the present invention may now be described with reference thereto. It should be understood that steps may be omitted from each process and/or the order of the steps may be changed without deviating from the spirit or scope of the invention. It is anticipated that in some applications, two or more steps may be performed more or less simultaneously to promote efficiency.

A method of fabricating an image retaining card may begin with the step of providing a substrate blank, and an image retaining cover. An image may then be printed onto the image retaining cover. In a preferred method, the image is printed onto the image retaining cover utilizing an inkjet printer.

A method in accordance with the present invention may include the step of laminating the image retaining cover to the substrate blank. The step of laminating the image retaining cover to the substrate blank may include the steps of laying the image retaining cover over the substrate blank, inserting the image retaining cover and the substrate blank into a protective sheath, and inserting the sheath into a laminator.

EXAMPLES

The following examples further disclose embodiments of the invention. In the examples which follow, all percentages are by weight, unless otherwise specified.

Example 1A

A substrate layer material comprising 96% polypropylene and 4% $TiO_2$ as prepared by combining 7C50 IMPACT polypropylene resin (Union Carbide Corporation, Danbury, Conn.) with a precompounded $TiO_2$/polypropylene material. The precompounded $TiO_2$/polypropylene material was purchased from Clariant Corporation of New Hope, Minn. which identifies it by the part number 1015100P. This material is precompounded at a ratio of 1 part $TiO_2$ to 1 part polypropylene. The substrate layer material was loaded into a twin screw extruder manufactured by Berstroff of Charlotte, N.C. The twin screw extruder had a L/D equal to 32 and was run at 100 RPM with a temperature profile of 148° C.–176° C.–204° C.–218° C.–218° C. –218° C.

The substrate tie layer material comprised ELVAX 3175 ethylene vinyl acetate polymer available from E.I. DuPont de Nemours and Company of Wilmington, Del. The substrate tie layer material was loaded into a single screw extruder manufactured by Davis-Standard, Pawcatuck, Conn. The single screw extruder had a L/D equal to 27 and was run at approximately 10 RPM with a temperature profile of 148° C.–176° C.–218° C.

A substrate structure comprising a substrate layer and a substrate tie layer was prepared by co-extrusion. Both extruders were equipped with downstream metering pumps. The melt streams downstream of the metering pumps from both extruders were fed into a co-extrusion die. The substrate layer material was extruded to produce a final thickness of 0.690 mm and the substrate tie layer material was extruded to produce a final thickness of 0.170 mm. The extrudate from the die was cast on a heated chrome cast wheel and collected on a wind up wheel.

Two test samples were cut from the resulting substrate layer/substrate tie layer composite. The test samples were placed one on top of the other with the tie layer of the first sample facing the tie layer of the second sample. The two samples were then heat bonded together. The heat bonding was performed using a TLC model 5660 (TLC, Evanston, Ill.) thermal laminator with the interface temperature of 148° C. A test strip measuring about 1" wide and 5" long was cut from the heat bonded material.

A 180 T-peel adhesion test was performed on the test strip using an Instron model 1122 testing machine (Instron Corporation, Park Ridge, Ill.) equipped with a 500 N load cell. The crosshead speed was set to 6 inches/minute. The test strip failed at one of the substrate layer to substrate tie layer interfaces. The force to separate the test strip was recorded as 0.401 N/mm.

Example 1B

A substrate layer material comprising 76% polypropylene, 4% $TiO_2$, and 20% ethylene vinyl acetate polymer was prepared by combining 7C50 IMPACT polypropylene resin (Union Carbide Corporation, Danbury, Conn.) with a precompounded TiO2/polypropylene material (Clariant #1015100P), and ELVAX 3175 ethylene vinyl acetate polymer. The substrate layer material was loaded into a twin screw extruder manufactured by Berstroff of Charlotte, N.C. The twin screw extruder had a L/D equal to 32 and was run at 100 RPM with a temperature profile of 148° C.–176° C.–204° C.–218° C.–218° C.–218° C.–218° C.

The substrate tie layer material comprised ELVAX 3175 ethylene vinyl acetate polymer available from E.I. DuPont de Nemours and Company of Wilmington, Del. The substrate tie layer material was loaded into a single screw extruder manufactured by Davis-Standard, Pawcatuck, Conn. The single screw extruder had a L/D equal to 27 and was run at approximately 10 RPM with a temperature profile of 148° C.–176° C.–218° C.

A substrate structure comprising a substrate layer and a substrate tie layer was prepared by co-extrusion. Both extruders were equipped with downstream metering pumps. The melt streams downstream of the metering pumps from both extruders were fed into a co-extrusion die. The substrate layer material was extruded to produce a final thickness of 0.730 mm and the substrate tie layer material was extruded to produce a final thickness of 0.070 mm. The extrudate from the die was cast on a heated chrome cast wheel and collected on a wind up wheel.

Two test samples were cut from the resulting substrate layer/substrate tie layer composite. The test samples were placed one on top of the other with the tie layer of the first sample facing the tie layer of the second sample. The two samples were then heat bonded, together. The heat bonding was performed using a TLC model 5660 (TLC, Evanston, Ill.) thermal laminator with the interface temperature of 148° C. A test strip measuring about 1" wide and 5" long was cut from the heat bonded material.

A 180 T-peel adhesion test was performed on the test strip using an Instron model 1122 testing machine (Instron Corporation, Park Ridge, Ill.) equipped with a 500 N load cell. The crosshead speed was set to 6 inches/minute. The test strip failed at one of the substrate layer to substrate tie layer interfaces. The force to separate the test strip was recorded as 0.600 N/mm.

A sheet of microporous film (TESLIN available from PPG Industries of Pittsburgh Pa.) was imaged using an EPSON STYLUS COLOR 850 inkjet printer (available from U S Epson, Inc. of Torrance, Calif.) equipped with pigment/dye blend inkjet inks (cartridges ARC-S020108 (black) and ARC-S020089 (color) from MIS Associates Inc. of Lake Orion Mich.). The resulting image exhibited high color density and excellent line sharpness with no bleed or feathering between colors.

The image microporous film was placed on a substrate/tie layer composite prepared as described above. The imaged microporous film was covered with a sheet of ethylene-methacrylic acid ionomer (SURLYN 1707 available from E.I. DuPont de Nemours and Company of Wilmington, Del.). The construction was laminated using a TLC model 5560 thermal laminator. The interface temperature was about 145° C. The image quality was unchanged after lamination.

An attempt was made to separate the microporous film from the substrate/tie layer composite. The microporous film tore and/or stretched in a way which destroyed the integrity of the image. This indicated good interfacial adhesion between the microporous film and the substrate tie layer.

An attempt was made to separate the ethylene-methacrylic acid ionomer film from the microporous film. The ethylene-methacrylic acid ionomer film tore with some transfer of the image from the microporous film to the ethylene-methacrylic acid ionomer film. This destroyed the image integrity and indicated good adhesion between the microporous film and the ethylene-methacrylic acid ionomer film.

Example 2A

A substrate layer material comprising 96% polypropylene and 4% TiO2 as prepared by combining. PRO-FAX 6433 Homopolymer polypropylene (Montell, Wilmington, Del.) with a precompounded TiO2/polypropylene material (Clariant #1015100P). The substrate layer material was loaded into a twin screw extruder manufactured by Berstroff of Charlotte, N.C. The twin screw extruder had a L/D equal to 32 and was run at 100 RPM with a temperature profile of 148° C.–176° C.–204° C.–218° C.–218° C.–218° C.–218° C.

The substrate tie layer material comprised ELVAX 3175 ethylene vinyl acetate polymer available from E.I. DuPont de Nemours and Company of Wilmington, Del. The substrate tie layer material was loaded into a single screw extruder manufactured by Davis-Standard, Pawcatuck, Conn. The single screw extruder had a L/D equal to 27 and was run at approximately 10 RPM with a temperature profile of 148° C.–176° C.–218° C.

A substrate structure comprising a substrate layer and a substrate tie layer was prepared by co-extrusion. Both extruders were equipped with downstream metering pumps. The melt streams downstream of the metering pumps from both extruders were fed into a co-extrusion die. The substrate layer material was extruded to produce a final thickness of 0.820 mm and the substrate tie layer material was extruded to produce a final thickness of 0.082 mm. The extrudate from the die was cast on a heated chrome cast wheel and collected on a wind up wheel.

Two test samples were cut from the resulting substrate layer/substrate tie layer composite. The test samples were placed one on top of the other with the tie layer of the first sample facing the tie layer of the second sample. The two samples were then heat bonded together. The heat bonding was performed using a TLC model 5660 (TLC, Evanston, Ill.) thermal laminator with the interface temperature of 148° C. A test strip measuring about 1" wide and 5" long was cut from the heat bonded material.

A 180 T-peel adhesion test was performed on the test strip using an Instron model 1122 testing machine (Instron Corporation, Park Ridge, Ill.) equipped with a 500 N load cell. The crosshead speed was set to 6 inches/minute. The test strip failed at one of the substrate layer to substrate tie layer interfaces. The force to separate the test strip was recorded as 0.980 N/mm.

Example 2B

A substrate layer material comprising 76% polypropylene, 4% TiO2, and 20% ethylene vinyl acetate polymer was prepared by combining PRO-FAX,6433 Homopolymer polypropylene (Montell, Wilmington, Del.) with a precompounded TiO2/polypropylene material (Clariant #1015100P), and ELVAX 3175 ethylene vinyl acetate polymer. The substrate layer material was loaded into a twin screw extruder manufactured by Berstroff of Charlotte, N.C. The twin screw extruder had a L/D equal to 32 and was run at 100 RPM with a temperature profile of 148° C.–176° C.–204° C.–218° C.–218° C.–218° C.–218° C.

The substrate tie layer material comprised ELVAX 3175 ethylene vinyl acetate polymer available from E.I. DuPont de Nemours and Company of Wilmington, Del. The substrate tie layer material was loaded into a single screw extruder manufactured by Davis-Standard, Pawcatuck, Conn. The single screw extruder had a L/D equal to 27 and was run at approximately 10 RPM with a temperature profile of 148° C.–176° C.–218° C.

A substrate structure comprising a substrate layer and a substrate tie layer was prepared by co-extrusion. Both extruders were equipped with downstream metering pumps. The melt streams downstream of the metering pumps from both extruders were fed into a co-extrusion die. The substrate layer material was extruded to produce a final thickness of 0.840 mm and the substrate tie layer material was extruded to produce a final thickness of 0.060 mm. The extrudate from the die was cast on a heated chrome cast wheel and collected on a wind up wheel.

Two test samples were cut from the resulting substrate layer/substrate tie layer composite. The test samples were placed one on top of the other with the tie layer of the first sample facing the tie layer of the second sample. The two samples were then heat bonded together. The heat bonding was performed using a TLC model 5660 (TLC, Evanston, Ill.) thermal laminator with the interface temperature of 148° C. A test strip measuring about 1" wide and 5" long was cut from the heat bonded material.

A 180 T-peel adhesion test was performed on the test strip using an Instron model 1122 testing machine (Instron Corporation, Park Ridge, Ill.) equipped with a 500 N load cell. The crosshead speed was set to 6 inches/minute. The test strip failed at one of the substrate layer to substrate tie layer interfaces. The force to separate the test strip was recorded as 1.240 N/mm.

A sheet of microporous film (TESLIN available from PPG Industries of Pittsburgh Pa.) was imaged using an EPSON STYLUS COLOR 850 inkjet printer (available from U S Epson, Inc. of Torrance, Calif.) equipped with pigment/dye blend inkjet inks (cartridges ARC-S020108 (black) and ARC-S020089 (color) from MIS Associates Inc. of Lake Orion Mich.). The resulting image exhibited high color density and excellent line sharpness with no bleed or feathering between colors.

The image microporous film was placed on a substrate/tie layer composite prepared as described above. The imaged microporous film was covered with a sheet of ethylene-methacrylic acid ionomer (SURLYN 1707 available from E.I. DuPont de Nemours and Company of Wilmington, Del.). The construction was laminated using a TLC model 5560 thermal laminator. The interface temperature was about 145° C. The image quality was unchanged after lamination.

An attempt was made to separate the microporous film from the substrate/tie layer composite. The microporous film tore and/or stretched in a way which destroyed the integrity of the image. This indicated good interfacial adhesion between the microporous film and the substrate tie layer.

An attempt was made to separate the ethylene-methacrylic acid ionomer film from the microporous film. The ethylene-methacrylic acid ionomer film tore with some transfer of the image from the microporous film to the ethylene-methacrylic acid ionomer film. This destroyed the image integrity and indicated good adhesion between the microporous film and the ethylene-methacrylic acid ionomer film.

Example 3A

A substrate layer material comprising 96% polypropylene and 4% TiO2 as prepared by combining PRO-FAX 6433 Homopolymer polypropylene (Montell, Wilmington, Del.) with a precompounded TiO2/polypropylene material (Clariant #1015100P). The substrate layer material was loaded into a twin screw extruder manufactured by Berstroff of Charlotte, N.C. The twin screw extruder had a L/D equal to 32 and was run at 100 RPM with a temperature profile of 148° C.–176° C.–204° C.–218° C.–218° C.–218° C.–218° C.

The substrate tie layer material comprised BYNEL 3101 acid/acrylate-modified ethylene vinyl acetate polymer available from E.I. DuPont de Nemours and Company of Wilmington, Del. The substrate tie layer material was loaded into a single screw extruder manufactured by Davis-Standard, Pawcatuck, Conn. The single screw extruder had a L/D equal to 27 and was run at approximately 10 RPM with a temperature profile of 148° C.–176° C.–218° C.

A substrate structure comprising a substrate layer and a substrate tie layer was prepared by co-extrusion. Both extruders were equipped with downstream metering pumps. The melt streams downstream of the metering pumps from both extruders were fed into a co-extrusion die. The substrate layer material was extruded to produce a final thickness of 0.520 mm and the substrate tie layer material was extruded to produce a final thickness of 0.055 mm. The extrudate from the die was cast on a heated chrome cast wheel and collected on a wind up wheel.

Two test samples were cut from the resulting substrate layer/substrate tie layer composite. The test samples were placed one on top of the other with the tie layer of the first sample facing the tie layer of the second sample. The two samples were then heat bonded together. The heat bonding was performed using a TLC model 5660 (TLC, Evanston, Ill.) thermal laminator with the interface temperature of 148° C. A test strip measuring about 1" wide and 5" long was cut from the heat bonded material.

A 180 T-peel adhesion test was performed on the test strip using an Instron model 1122 testing machine (Instron Corporation, Park Ridge, Ill.) equipped with a 500 N load cell. The crosshead speed was set to 6 inches/minute. The test strip failed at one of the substrate layer to substrate tie layer interfaces. The force to separate the test strip was recorded as 0.980 N/mm.

A sheet of microporous film (TESLIN available from PPG Industries of Pittsburgh Pa.) was imaged using an EPSON STYLUS COLOR 850 inkjet printer (available from U S Epson, Inc. of Torrance, Calif.) equipped with pigment/dye blend inkjet inks (cartridges ARC-S020108 (black) and ARC-S020089 (color) from MIS Associates Inc. of Lake Orion Mich.). The resulting image exhibited high color density and excellent line sharpness with no bleed or feathering between colors.

The image microporous film was placed on a substrate/tie layer composite prepared as described above. The imaged microporous film was covered with a sheet of ethylene-methacrylic acid ionomer (SURLYN 1707 available from E.I. DuPont de Nemours and Company of Wilmington, Del.). The construction was laminated using a TLC model 5560 thermal laminator. The interface temperature was about 145° C. The image quality was unchanged after lamination.

An attempt was made to separate the microporous film from the substrate/tie layer composite. The microporous film tore and/or stretched in a way which destroyed the integrity of the image. This indicated good interfacial adhesion between the microporous film and the substrate tie layer.

An attempt was made to separate the ethylene-methacrylic acid ionomer film from the microporous film. The ethylene-methacrylic acid ionomer film tore with some transfer of the image from the microporous film to the ethylene-methacrylic acid ionomer film. This destroyed the image integrity and indicated good adhesion between the microporous film and the ethylene-methacrylic acid ionomer film.

Example 3B

A substrate layer material comprising 76% polypropylene, 4% TiO2, and 20% acid/acrylate-modified ethylene vinyl acetate polymer was prepared by combining PRO-FAX 6433 Homopolymer polypropylene (Montell, Wilmington, Del.) with a precompounded TiO2/polypropylene material (Clariant #1015100P), and BYNEL 3101 acid/acrylate-modified ethylene vinyl acetate polymer. The substrate layer material was loaded into a twin screw extruder manufactured by Berstroff of Charlotte, N.C. The twin screw extruder had a L/D equal to 32 and was run at 100 RPM with a temperature profile of 148° C.–176° C.–204° C.–218° C.–218° C.–218° C.–218° C.

The substrate tie layer material comprised BYNEL 3101 acid/acrylate-modified ethylene vinyl acetate polymer available from E.I. DuPont de Nemrours and Company of Wilmington, Del. The substrate tie layer material was loaded into a single screw extruder manufactured by Davis-Standard, Pawcatuck, Conn. The single screw extruder had a L/D equal to 27 and was run at approximately 10 RPM with a temperature profile of 148° C.–176° C.–218° C.

A substrate structure comprising a substrate layer and a substrate tie layer was prepared by co-extrusion. Both extruders were equipped with downstream metering pumps. The melt streams downstream of the metering pumps from both extruders were fed into a co-extrusion die. The substrate layer material was extruded to produce a final thickness of 0.680 mm and the substrate tie layer material was extruded to produce a final thickness of 0.180 mm. The extrudate from the die was cast on a heated chrome cast wheel and collected on a wind up wheel.

Two test samples were cut from the resulting substrate layer/substrate tie layer composite. The test samples were placed one on top of the other with the tie layer of the first sample facing the tie layer of the second sample. The two samples were then heat bonded together. The heat bonding was performed using a TLC model 5660 (TLC, Evanston, Ill.) thermal laminator with the interface temperature of 148° C. A test strip measuring about 1" wide and 5" long was cut from the heat bonded material.

A 180 T-peel adhesion test was performed on the test strip using an Instron model 1122 testing machine (Instron Corporation, Park Ridge, Ill.) equipped with a 500 N load cell. The crosshead speed was set to 6 inches/minute. The test strip failed at one of the substrate layer to substrate tie layer interfaces. The force to separate the test strip was recorded as 1.240 N/mm.

A sheet of microporous film (TESLIN available from PPG Industries of Pittsburgh Pa.) was imaged using an EPSON STYLUS COLOR 850 inkjet printer (available from U S Epson, Inc. of Torrance, Calif.) equipped with pigment/dye blend inkjet inks (cartridges ARC-S020108 (black) and ARC-S020089 (color) from MIS Associates Inc. of Lake Orion Mich.). The resulting image exhibited high color density and excellent line sharpness with no bleed or feathering between colors.

The image microporous film was placed on a substrate/tie layer composite prepared as described above. The imaged microporous film was covered with a sheet of ethylene-methacrylic acid ionomer (SURLYN 1707 available from E.I. DuPont de Nemours and Company of Wilmington, Del.). The construction was laminated using a TLC model 5560 thermal laminator. The interface temperature was about 145° C. The image quality was unchanged after lamination.

An attempt was made to separate the microporous film from the substrate/tie layer composite. The microporous film tore and/or stretched in a way which destroyed the integrity of the image. This indicated good interfacial adhesion between the microporous film and the substrate tie layer.

An attempt was made to separate the ethylene-methacrylic acid ionomer film from the microporous film. The ethylene-methacrylic acid ionomer film tore with some transfer of the image from the microporous film to the ethylene-methacrylic acid ionomer film. This destroyed the image integrity and indicated good adhesion between the microporous film and the ethylene-methacrylic acid ionomer film.

Example 4A

A substrate layer material comprising 96% polypropylene and 4% TiO2 as prepared by combining 7C50 IMPACT polypropylene resin (Union Carbide Corporation, Danbury, Conn.) with a precompounded TiO2/polypropylene material (Clariant #1015100P). The substrate layer material was loaded into a twin screw extruder manufactured by Berstroff of Charlotte, N.C. The twin screw extruder had a L/D equal to 32 and was run at 100 RPM with a temperature profile of 148° C.–176° C.–204° C.–218° C.–218° C.–218° C.–218° C.

The substrate tie layer material comprised BYNEL 3101 acid/acrylate-modified ethylene vinyl acetate polymer available from E.I. DuPont de Nemours and Company of Wilmington, Del. The substrate tie layer material was loaded into a single screw extruder manufactured by Davis-Standard, Pawcatuck, Conn. The single screw extruder had a L/D equal to 27 and was run at approximately 10 RPM with a temperature profile of 148° C.–176° C.–218° C.

A substrate structure comprising a substrate layer and a substrate tie layer was prepared by co-extrusion. Both extruders were equipped with downstream metering pumps. The melt streams downstream of the metering pumps from both extruders were fed into a co-extrusion die. The substrate layer material was extruded to produce a final thickness of 0.590 mm and the substrate tie layer material was extruded to produce a final thickness of 0.420 mm. The extrudate from the die was cast on a heated chrome cast wheel and collected on a wind up wheel.

Two test samples were cut from the resulting substrate layer/substrate tie layer composite. The test samples were placed one on top of the other with the tie layer of the first sample facing the tie layer of the second sample. The two samples were then heat bonded together. The heat bonding was performed using a TLC model 5660 (TLC, Evanston, Ill.) thermal laminator with the interface temperature of 148° C. A test strip measuring about 1" wide and 5" long was cut from the heat bonded material.

A 180 T-peel adhesion test was performed on the test strip using an Instron model 1122 testing machine (Instron Corporation, Park Ridge, Ill.) equipped with a 500 N load cell. The crosshead speed was set to 6 inches/minute. The test strip failed at one of the substrate layer to substrate tie layer interfaces. The force to separate the test strip was recorded as 0.672 N/mm.

A sheet of microporous film (TESLIN available from PPG Industries of Pittsburgh Pa.) was imaged using an EPSON STYLUS COLOR 850 inkjet printer (available from U S Epson, Inc. of Torrance, Calif.) equipped with pigment/dye blend inkjet inks (cartridges ARC-S020108 (black) and ARC-S020089 (color) from MIS Associates Inc. of Lake Orion Mich.). The resulting image exhibited high color density and excellent line sharpness with no bleed or feathering between colors.

The image microporous film was placed on a substrate/tie layer composite prepared as described above. The imaged microporous film was covered with a sheet of ethylene-methacrylic acid ionomer (SURLYN 1707 available from E.I. DuPont de Nemours and Company of Wilmington, Del.). The construction was laminated using a TLC model 5560 thermal laminator. The interface temperature was about 145° C. The image quality was unchanged after lamination.

An attempt was made to separate the microporous film from the substrate/tie layer composite. The microporous film tore and/or stretched in a way which destroyed the integrity of the image. This indicated good interfacial adhesion between the microporous film and the substrate tie layer.

An attempt was made to separate the ethylene-methacrylic acid ionomer film from the microporous film. The ethylene-methacrylic acid ionomer film tore with some transfer of the image from the microporous film to the ethylene-methacrylic acid ionomer film. This destroyed the image integrity and indicated good adhesion between the microporous film and the ethylene-methacrylic acid ionomer film.

Example 4B

A substrate layer material comprising 76% polypropylene, 4% TiO2, and 20% acid/acrylate-modified ethylene vinyl acetate polymer was prepared by combining 7C50 IMPACT polypropylene resin (Union Carbide Corporation, Danbury, Conn.) with a precompounded TiO2/polypropylene material (Clariant #1015100P), and BYNEL 3101 acid/acrylate-modified ethylene vinyl acetate polymer. The substrate layer material was loaded into a twin screw extruder manufactured by Berstroff of Charlotte, N.C. The twin screw extruder had a L/D equal to 32 and was run at 100 RPM with a temperature profile of 148° C.–176° C.–204° C.–218° C.–218° C.–218° C.–218° C.

The substrate tie layer material comprised BYNEL 3101 acid/acrylate-modified ethylene vinyl acetate polymer available from E.I. DuPont de Nemours and Company of Wilmington, Del. The substrate tie layer material was loaded into a single screw extruder manufactured by Davis-Standard, Pawcatuck, Conn. The single screw extruder had a L/D equal to 27 and was run at approximately 10 RPM with a temperature profile of 148° C.–176° C.–218° C.

A substrate structure comprising a substrate layer and a substrate tie layer was prepared by co-extrusion. Both extruders were equipped with downstream metering pumps. The melt streams downstream of the metering pumps from both extruders were fed into a co-extrusion die. The substrate layer material was extruded to produce a final thickness of 0.560 mm and the substrate tie layer material was extruded to produce a final thickness of 0.020 mm. The extrudate from the die was cast on a heated chrome cast wheel and collected on a wind up wheel.

Two test samples were cut from the resulting substrate layer/substrate tie layer composite. The test samples were placed one on top of the other with the tie layer of the first sample facing the tie layer of the second sample. The two samples were then heat bonded together. The heat bonding was performed using a TLC model 5660 (TLC, Evanston, Ill.) thermal laminator with the interface temperature of 148° C. A test strip measuring about 1" wide and 5" long was cut from the heat bonded material.

A 180 T-peel adhesion test was performed on the test strip using an Instron model 1122 testing machine (Instron Corporation, Park Ridge, Ill.) equipped with a 500 N load cell. The crosshead speed was set to 6 inches/minute. The test strip failed at one of the substrate layer to substrate tie layer interfaces. The force to separate the test strip was recorded as 0.823 N/mm.

A sheet of microporous film (TESLIN available from PPG Industries of Pittsburgh Pa.) was imaged using an EPSON STYLUS COLOR 850 inkjet printer (available from U S Epson, Inc. of Torrance, Calif.) equipped with pigment/dye blend inkjet inks (cartridges ARC-S020108 (black) and ARC-S020089 (color) from MIS Associates Inc. of Lake Orion Mich.). The resulting image exhibited high color density and excellent line sharpness with no bleed or feathering between colors.

The image microporous film was placed on a substrate/tie layer composite prepared as described above. The imaged microporous film was covered with a sheet of ethylene-methacrylic acid ionomer (SURLYN 1707 available from E.I. DuPont de Nemours and Company of Wilmington, Del.). The construction was laminated using a TLC model 5560 thermal laminator. The interface temperature was about 145° C. The image quality was unchanged after lamination.

An attempt was made to separate the microporous film from the substrate/tie layer composite. The microporous film tore and/or stretched in a way which destroyed the integrity of the image. This indicated good interfacial adhesion between the microporous film and the substrate tie layer.

An attempt was made to separate the ethylene-methacrylic acid ionomer film from the microporous film. The ethylene-methacrylic acid ionomer film tore with some transfer of the image from the microporous film to the ethylene-methacrylic acid ionomer film. This destroyed the image integrity and indicated good adhesion between the microporous film and the ethylene-methacrylic acid ionomer film.

Example 5A

A substrate layer material comprising 92% ADFLEX KS-011P olefin, 4% polypropylene, and 4% TiO2 as prepared by combining ADFLEX KS-011P thermoplastic olefin resin (Montell, Wilmington, Del.) with precompounded TiO2/polypropylene material (Clariant #1015100P). The substrate layer material was loaded into a twin screw extruder manufactured by Berstroff of Charlotte, N.C. The twin screw extruder had a L/D equal to 32 and was run at 100 RPM with a temperature profile of 148° C.–176° C.–204° C.–218° C.–218° C.–218° C.–218° C.

The substrate tie layer material comprised BYNEL 3101 acid/acrylate-modified ethylene vinyl acetate polymer available from E.I. DuPont de Nemours and Company of Wilmington, Del. The substrate tie layer material was loaded into a single screw extruder manufactured by Davis-Standard, Pawcatuck, Conn. The single screw extruder had a L/D equal to 27 and was run at approximately 10 RPM with a temperature profile of 148° C.–176° C.–218° C.

A substrate structure comprising a substrate layer and a substrate tie layer was prepared by co-extrusion. Both extruders were equipped with downstream metering pumps. The melt streams downstream of the metering pumps from both extruders were fed into a co-extrusion die. The substrate layer material was extruded to produce a final thickness of 0.530 mm and the substrate tie layer material was extruded to produce a final thickness of 0.200 mm. The extrudate from the die was cast on a heated chrome cast wheel and collected on a wind up wheel.

Two test samples were cut from the resulting substrate layer/substrate tie layer composite. The test samples were placed one on top of the other with the tie layer of the first sample facing the tie layer of the second sample. The two samples were then heat bonded together. The heat bonding was performed using a TLC model 5660 (TLC, Evanston, Ill.) thermal laminator with the interface temperature of 148° C. A test strip measuring about 1" wide and 5" long was cut from the heat bonded material.

A 180 T-peel adhesion test was performed on the test strip using an Instron model 1122 testing machine (Instron Corporation, Park Ridge, Ill.) equipped with a 500 N load cell. The crosshead speed was set to 6 inches/minute. The test strip failed at one of the substrate layer to substrate tie layer interfaces. The force to separate the test strip was recorded as 0.738 N/mm.

A sheet of microporous film (TESLIN available from PPG Industries of Pittsburgh Pa.) was imaged using an EPSON STYLUS COLOR 850 inkjet printer (available from U S Epson, Inc. of Torrance, Calif.) equipped with pigment/dye blend inkjet inks (cartridges ARC-S020108 (black) and ARC-S020089 (color) from MIS Associates Inc. of Lake Orion Mich.). The resulting image exhibited high color density and excellent line sharpness with no bleed or feathering between colors.

The image microporous film was placed on a substrate/tie layer composite prepared as described above. The imaged microporous film was covered with a sheet of ethylene-methacrylic acid ionomer. (SURLYN 1707 available from E.I. DuPont de Nemours and Company of Wilmington, Del.). The construction was laminated using a TLC model 5560 thermal laminator. The interface temperature was about 145° C. The image quality was unchanged after lamination.

An attempt was made to separate the microporous film from the substrate/tie layer composite. The microporous film tore and/or stretched in a way which destroyed the integrity of the image. This indicated good interfacial adhesion between the microporous film and the substrate tie layer.

An attempt was made to separate the ethylene-methacrylic acid ionomer film from the microporous film. The ethylene-methacrylic acid ionomer film tore with some transfer of the image from the microporous film to the ethylene-methacrylic acid ionomer film. This destroyed the image integrity and indicated good adhesion between the microporous film and the ethylene-methacrylic acid ionomer film.

Example 5B

A substrate layer material comprising 72% ADFLEX KS-011P olefin, 4% polypropylene, 4% TiO2, and 20% acid/acrylate-modified ethylene vinyl acetate polymer was prepared by combining ADFLEX KS-011P thermoplastic olefin resin (Montell, Wilmington, Del.) with a precompounded TiO2/polypropylene material (Clariant #1015100P), and BYNEL 3101 acid/acrylate-modified ethylene vinyl acetate polymer. The substrate layer material was loaded into a twin screw extruder manufactured by Berstroff of Charlotte, N.C. The twin screw extruder had a L/D equal to 32 and was run at 100 RPM with a temperature profile of 148° C.–176° C.–204° C.–218° C.–218° C.–218° C.–218° C.

The substrate tie layer material comprised BYNEL 3101 acid/acrylate-modified ethylene vinyl acetate polymer available from E.I. DuPont de Nemours and Company of Wilmington, Del. The substrate tie layer material was loaded into a single screw extruder manufactured by Davis-Standard, Pawcatuck, Conn. The single screw extruder had a L/D equal to 27 and was run at approximately 10 RPM with a temperature profile of 148° C.–176° C.–218° C.

A substrate structure comprising a substrate layer and a substrate tie layer was prepared by co-extrusion. Both extruders were equipped with downstream metering pumps. The melt streams downstream of the metering pumps from both extruders were fed into a co-extrusion die. The substrate layer material was extruded to produce a final thickness of 0.570 mm and the substrate tie layer material was extruded to produce a final thickness of 0.180 mm. The extrudate from the die was cast on a heated chrome cast wheel and collected on a wind up wheel.

Two test samples were cut from the resulting substrate layer/substrate tie layer composite. The test samples were placed one on top of the other with the tie layer of the first sample facing the tie layer of the second sample. The two samples were then heat bonded together. The heat bonding was performed using a TLC model 5660 (TLC, Evanston, Ill.) thermal laminator with the interface temperature of 148° C. A test strip measuring about 1" wide and 5" long was cut from the heat bonded material.

A 180 T-peel adhesion test was performed on the test strip using an Instron model 1122 testing machine (Instron Corporation, Park Ridge, Ill.) equipped with a 500 N load cell. The crosshead speed was set to 6 inches/minute. The test strip failed at one of the substrate layer to substrate tie layer interfaces. The force to separate the test strip was recorded as 1.030 N/mm.

A sheet of microporous film (TESLIN available from PPG Industries of Pittsburgh Pa.) was imaged using an EPSON STYLUS COLOR 850 inkjet printer (available from U S Epson, Inc. of Torrance, Calif.) equipped with pigment/dye blend inkjet inks (cartridges ARC-S020108 (black) and ARC-S020089 (color) from MIS Associates Inc. of Lake Orion Mich.). The resulting image exhibited high color density and excellent line sharpness with no bleed or feathering between colors.

The image microporous film was placed on a substrate/tie layer composite prepared as described above. The imaged microporous film was covered with a sheet of ethylene-methacrylic acid ionomer (SURLYN 1707 available from E.I. DuPont de Nemours and Company of Wilmington, Del.). The construction was laminated using a TLC model 5560 thermal laminator. The interface temperature was about 145° C. The image quality was unchanged after lamination.

An attempt was made to separate the microporous film from the substrate/tie layer composite. The microporous film tore and/or stretched in a way which destroyed the integrity of the image. This indicated good interfacial adhesion between the microporous film and the substrate tie layer.

An attempt was made to separate the ethylene-methacrylic acid ionomer film from the microporous film. The ethylene-methacrylic acid ionomer film tore with some transfer of the image from the microporous film to the ethylene-methacrylic acid ionomer film. This destroyed the image integrity and indicated good adhesion between the microporous film and the ethylene-methacrylic acid ionomer film.

Example 6A

A substrate layer material comprising 96% polypropylene copolymer and 4% TiO2 as prepared by combining FINA Z-9470 Polypropylene copolymer (Fina Oil and Chemical Company, Dallas, Tex.) with a precompounded TiO2/polypropylene material (Clariant #1015100P). The substrate layer material was loaded into a twin screw extruder manufactured by Berstroff of Charlotte, N.C. The twin screw extruder had a L/D equal to 32 and was run at 100 RPM with a temperature profile of 148° C.–176° C.–204° C.–218° C.–218° C.–218° C.–218° C.

The substrate tie layer material comprised BYNEL 3101 acid/acrylate-modified ethylene vinyl acetate polymer available from E.I. DuPont de Nemours and Company of Wilmington, Del. The substrate tie layer material was loaded into a single screw extruder manufactured by Davis-Standard, Pawcatuck, Conn. The single screw extruder had a L/D equal to 27 and was run at approximately 10 RPM with a temperature profile of 148° C.–176° C.–218° C.

A substrate structure comprising a substrate layer and a substrate tie layer was prepared by co-extrusion. Both extruders were equipped with downstream metering pumps. The melt streams downstream of the metering pumps from both extruders were fed into a co-extrusion die. The substrate layer material was extruded to produce a final thickness of 0.450 mm and the substrate tie layer material was extruded to produce a final thickness of 0.240 mm. The extrudate from the die was cast on a heated chrome cast wheel and collected on a wind up wheel.

Two test samples were cut from the resulting substrate layer/substrate tie layer composite. The test samples were placed one on top of the other with the tie layer of the first sample facing the tie layer of the second sample. The two samples were then heat bonded together. The heat bonding was performed using a TLC model 5660 (TLC, Evanston, Ill.) thermal laminator with the interface temperature of 148° C. A test strip measuring about 1" wide and 5" long was cut from the heat bonded material.

A 180 T-peel adhesion test was performed on the test strip using an Instron model 1122 testing machine (Instron Corporation, Park Ridge, Ill.) equipped with a 500 N load cell. The crosshead speed was set to 6 inches/minute. The test strip failed at one of the substrate layer to substrate tie layer interfaces. The force to separate the test strip was recorded as 0.099 N/mm.

Example 6B

A substrate layer material comprising 76% polypropylene copolymer, 4% TiO2, and 20% acid/acrylate-modified ethylene vinyl acetate polymer was prepared by combining FINA Z-9470 Polypropylene copolymer (Fina Oil and Chemical Company, Dallas, Tex.) with a precompounded TiO2/polypropylene material (Clariant #1015100P), and BYNEL 3101 acid/acrylate-modified ethylene vinyl acetate polymer. The substrate layer material was loaded into a twin screw extruder manufactured by Berstroff of Charlotte, N.C. The twin screw extruder had a L/D equal to 32 and was run at 100 RPM with a temperature profile of 148° C.–176° C.–204° C.–218° C.–218° C.–218° C.–218° C.

The substrate tie layer material comprised BYNEL 3101 acid/acrylate-modified ethylene vinyl acetate polymer available from E.I. DuPont de Nemours and Company of Wilmington, Del. The substrate tie layer material was loaded into a single screw extruder manufactured by Davis-Standard, Pawcatuck, Conn. The single screw extruder had a L/D equal to 27 and was run at approximately 10 RPM with a temperature profile of 148° C.–176° C.–218° C.

A substrate structure comprising a substrate layer and a substrate tie layer was prepared by co-extrusion. Both extruders were equipped with downstream metering pumps. The melt streams downstream of the metering pumps from both extruders were fed into a co-extrusion die. The substrate layer material was extruded to produce a final thickness of 0.600 mm and the substrate tie layer material was extruded to produce a final thickness of 0.220 mm. The extrudate from the die was cast on a heated chrome cast wheel and collected on a wind up wheel.

Two test samples were cut from the resulting substrate layer/substrate tie layer composite. The test samples were placed one on top of the other with the tie layer of the first sample facing the tie layer of the second sample. The two samples were then heat bonded together. The heat bonding was performed using a TLC model 5660 (TLC, Evanston, Ill.) thermal laminator with the interface temperature of 148° C. A test strip measuring about 1" wide and 5" long was cut from the heat bonded material.

A 180 T-peel adhesion test was performed on the test strip using an Instron model 1122 testing machine (Instron Corporation, Park Ridge, Ill.) equipped with a 500 N load cell. The crosshead speed was set to 6 inches/minute. The test strip failed at one of the substrate layer to substrate tie layer interfaces. The force to separate the test strip was recorded as 0.900 N/mm.

A sheet of microporous film (TESLIN available from PPG Industries of Pittsburgh Pa.) was imaged using an EPSON STYLUS COLOR 850 inkjet printer (available from U S Epson, Inc. of Torrance, Calif.) equipped with pigment/dye blend inkjet inks (cartridges ARC-S020108 (black) and ARC-S020089 (color) from MIS Associates Inc. of Lake Orion Mich.). The resulting image exhibited high color density and excellent line sharpness with no bleed or feathering between colors.

The image microporous film was placed on a substrate/tie layer composite prepared as described above. The imaged microporous film was covered with a sheet of ethylene-methacrylic acid ionomer (SURLYN 1707 available from E.I. DuPont de Nemours and Company of Wilmington, Del.). The construction was laminated using a TLC model 5560 thermal laminator. The interface temperature was about 145° C. The image quality was unchanged after lamination.

An attempt was made to separate the microporous film from the substrate/tie layer composite. The microporous film tore and/or stretched in a way which destroyed the integrity of the image. This indicated good interfacial adhesion between the microporous film and the substrate tie layer.

An attempt was made to separate the ethylene-methacrylic acid ionomer film from the microporous film. The ethylene-methacrylic acid ionomer film tore with some transfer of the image from the microporous film to the ethylene-methacrylic acid ionomer film. This destroyed the image integrity and indicated good adhesion between the microporous film and the ethylene-methacrylic acid ionomer film.

Example 7

A substrate layer material comprising 76% polypropylene, 4% TiO2, and 20% acid/acrylate-modified ethylene vinyl acetate polymer was prepared by combining PRO-FAX 6433 Homopolymer polypropylene (Montell, Wilmington, Del.) with a precompounded TiO2/polypropylene material (Clariant #1015100P), and BYNEL 3101 acid/acrylate-modified ethylene vinyl acetate polymer. The substrate layer material was loaded into a twin screw extruder manufactured by Berstroff of Charlotte, N.C. The twin screw extruder had a L/D equal to 32 and was run at 100 RPM with a temperature profile of 148° C.–176° C.–204° C.–218° C.–218° C.–218° C.–218° C.

The substrate tie layer material comprised 80% BYNEL 3101 acid/acrylate-modified ethylene vinyl acetate polymer and 20% ELVALOY 741 resin modifier (both available from E.I. DuPont de Nemours and Company of Wilmington, Del.). The substrate tie layer material was loaded into a single screw extruder manufactured by Davis-Standard, Pawcatuck, Conn. The single screw extruder had a L/D equal to 27 and was run at approximately 10 RPM with a temperature profile of 148° C.–176° C.–218° C.

A substrate structure comprising a substrate layer and a substrate tie layer was prepared by co-extrusion. Both extruders were equipped with downstream metering pumps. The melt streams downstream of the metering pumps from both extruders were fed into a co-extrusion die. The substrate layer material was extruded to produce a final thickness of 0.580 mm and the substrate tie layer material was extruded to produce a final thickness of 0.160 mm. The extrudate from the die was cast on a heated chrome cast wheel and collected on a wind up wheel.

Two test samples were cut from the resulting substrate layer/substrate tie layer composite. The test samples were placed one on top of the other with the tie layer of the first sample facing the tie layer of the second sample. The two samples were then heat bonded together. The heat bonding was performed using a TLC model 5660 (TLC, Evanston, Ill.) thermal laminator with the interface temperature of 148° C. A test strip measuring about 1" wide and 5" long was cut from the heat bonded material.

A 180 T-peel adhesion test was performed on the test strip using an Instron model 1122 testing machine (Instron Corporation, Park Ridge, Ill.) equipped with a 500 N load cell. The crosshead speed was set to 6 inches/minute. The test strip failed at one of the substrate layer to substrate tie layer interfaces. The force to separate the test strip was recorded as 2.100 N/mm.

A sheet of microporous film (TESLIN available from PPG Industries of Pittsburgh Pa.) was imaged using an EPSON STYLUS COLOR 850 inkjet printer (available from U S Epson, Inc. of Torrance, Calif.) equipped with pigment/dye blend inkjet inks (cartridges ARC-S020108 (black) and ARC-S020089 (color) from MIS Associates Inc. of Lake Orion Mich.). The resulting image exhibited high color density and excellent line sharpness with no bleed or feathering between colors.

The image microporous film was placed on a substrate/tie layer composite prepared as described above. The imaged microporous film was covered with a sheet of ethylene-methacrylic acid ionomer (SURLYN 1707 available from E.I. DuPont de Nemours and Company of Wilmington, Del.). The construction was laminated using a TLC model 5560 thermal laminator. The interface temperature was about 145° C. The image quality was unchanged after lamination.

An attempt was made to separate the microporous film from the substrate/tie layer composite. The microporous film tore and/or stretched in a way which destroyed the integrity of the image. This indicated good interfacial adhesion between the microporous film and the substrate tie layer.

An attempt was made to separate the ethylene-methacrylic acid ionomer film from the microporous film. The ethylene-methacrylic acid ionomer film tore with some transfer of the image from the microporous film to the ethylene-methacrylic acid ionomer film. This destroyed the image integrity and indicated good adhesion between the microporous film and the ethylene-methacrylic acid ionomer film.

Example 8

A substrate layer material comprising 76% polypropylene, 4% TiO2, and 20% acid/acrylate-modified ethylene vinyl acetate polymer was prepared by combining 7C50 IMPACT polypropylene resin (Union Carbide Corporation, Danbury, Conn.) with a precompounded TiO2/polypropylene material (Clariant #1015100P), and BYNEL 3101 acid/acrylate-modified ethylene vinyl acetate polymer. The substrate layer material was loaded into a twin screw extruder manufactured by Berstroff of Charlotte, N.C. The twin screw extruder had a L/D equal to 32 and was run at 100 RPM with a temperature profile of 148° C.–176° C.–204° C.–218° C.–218° C.–218° C.–218° C.

The substrate tie layer material comprised 80% BYNEL 3101 acid/acrylate-modified ethylene vinyl acetate polymer and 20% ELVALOY 741 resin modifier (both available from E.I. DuPont de Nemours and Company of Wilmington, Del.). The substrate tie layer material was loaded into a single screw extruder manufactured by Davis-Standard, Pawcatuck, Conn. The single screw extruder had a L/D equal to 27 and was run at approximately 10 RPM with a temperature profile of 148° C.–176° C.–218° C.

A substrate structure comprising a substrate layer and a substrate tie layer was prepared by co-extrusion. Both extruders were equipped with downstream metering pumps. The melt streams downstream of the metering pumps from both extruders were fed into a co-extrusion die. The substrate layer material was extruded to produce a final thickness of 0.610 mm and the substrate tie layer material was extruded to produce a final thickness of 0.140 mm. The extrudate from the die was cast on a heated chrome cast wheel and collected on a wind up wheel.

Two test samples were cut from the resulting substrate layer/substrate tie layer composite. The test samples were placed one on top of the other with the tie layer of the first sample facing the tie layer of the second sample. The two samples were then heat bonded together. The heat bonding was performed using a TLC model 5660 (TLC, Evanston, Ill.) thermal laminator with the interface temperature of 148° C. A test strip measuring about 1" wide and 5" long was cut from the heat bonded material.

A 180 T-peel adhesion test was performed on the test strip using an Instron model 1122 testing machine (Instron Corporation, Park Ridge, Ill.) equipped with a 500 N load cell. The crosshead speed was set to 6 inches/minute. The test strip failed at one of the substrate layer to substrate tie layer interfaces. The force to separate the test strip was recorded as 1.680 N/mm.

A sheet of microporous film (TESLIN available from PPG Industries of Pittsburgh Pa.) was imaged using an EPSON STYLUS COLOR 850 inkjet printer (available from U S Epson, Inc. of Torrance, Calif.) equipped with pigment/dye blend inkjet inks (cartridges ARC-S020108 (black) and ARC-S020089 (color) from MIS Associates Inc. of Lake Orion Mich.). The resulting image exhibited high color density and excellent line sharpness with no bleed or feathering between colors.

The image microporous film was placed on a substrate/tie layer composite prepared as described above. The imaged microporous film was covered with a sheet of ethylene-methacrylic acid ionomer (SURLYN 1707 available from E.I. DuPont de Nemours and Company of Wilmington, Del.). The construction was laminated using a TLC model 5560 thermal laminator. The interface temperature was about 145° C. The image quality was unchanged after lamination.

An attempt was made to separate the microporous film from the substrate/tie layer composite. The microporous film tore and/or stretched in a way which destroyed the integrity of the image. This indicated good interfacial adhesion between the microporous film and the substrate tie layer.

An attempt was made to separate the ethylene-methacrylic acid ionomer film from the microporous film. The ethylene-methacrylic acid ionomer film tore with some transfer of the image from the microporous film to the ethylene-methacrylic acid ionomer film. This destroyed the image integrity and indicated good adhesion between the microporous film and the ethylene-methacrylic acid ionomer film.

Example 9

A substrate layer material comprising 96% polypropylene and 4% $TiO_2$ as prepared by combining 7C50 IMPACT polypropylene resin (Union Carbide Corporation, Danbury, Conn.) with a precompounded $TiO_2$/polypropylene material (Clariant #1015100P). The substrate layer material was loaded into a twin screw extruder manufactured by Berstroff of Charlotte, N.C. The twin screw extruder had a L/D equal to 32 and was run at 100 RPM with a temperature profile of 148° C.–176° C.–204° C.–218° C.–218° C.–218° C.–218° C.

The substrate tie layer material comprised ELVALOY AS resin modifier available from E.I. DuPont de Nemours and Company of Wilmington, Del. The substrate tie layer material was loaded into a single screw extruder manufactured by Davis-Standard, Pawcatuck, Conn. The single screw extruder had a L/D equal to 27 and was run at approximately 10 RPM with a temperature profile of 148° C.–176° C.–218° C.

A substrate structure comprising a substrate layer and a substrate tie layer was prepared by co-extrusion. Both extruders were equipped with downstream metering pumps. The melt streams downstream of the metering pumps from both extruders were fed into a co-extrusion die. The substrate layer material was extruded to produce a final thickness of 0.540 mm and the substrate tie layer material was extruded to produce a final thickness of 0.315 mm. The extrudate from the die was cast on a heated chrome cast wheel and collected on a wind up wheel.

Two test samples were cut from the resulting substrate layer/substrate tie layer composite. The test samples were placed one on top of the other with the tie layer of the first sample facing the tie layer of the second sample. The two samples were then heat bonded together. The heat bonding was performed using a TLC model 5660 (TLC, Evanston, Ill.) thermal laminator with the interface temperature of 148° C. A test strip measuring about 1" wide and 5" long was cut from the heat bonded material.

A 180 T-peel adhesion test was performed on the test strip using an Instron model 1122 testing machine (Instron Corporation, Park Ridge, Ill.) equipped with a 500 N load cell. The crosshead speed was set to 6 inches/minute. The test strip failed at one of the substrate layer to substrate tie layer interfaces. The force to separate the test strip was recorded as 0.341 N/mm.

A sheet of microporous film (TESLIN available from PPG Industries of Pittsburgh Pa.) was imaged using an EPSON STYLUS COLOR 850 inkjet printer (available from U S Epson, Inc. of Torrance, Calif.) equipped with pigment/dye blend inkjet inks (cartridges ARC-S020108 (black) and ARC-S020089 (color) from MIS Associates Inc. of Lake Orion Mich.). The resulting image exhibited high color density and excellent line sharpness with no bleed or feathering between colors.

The imaged microporous film was placed on a substrate/tie layer composite prepared as described above. The imaged microporous film was covered with a sheet of ethylene-methacrylic acid ionomer (SURLYN 1707 available from E.I. DuPont de Nemours and Company of Wilmington, Del.). The construction was laminated using a TLC model 5560 thermal laminator. The interface temperature was about 145° C. The image quality was unchanged after lamination.

An attempt was made to separate the microporous film from the substrate/tie layer composite. The microporous film tore and/or stretched in a way which destroyed the integrity of the image. This indicated good interfacial adhesion between the microporous film and the substrate tie layer.

An attempt was made to separate the ethylene-methacrylic acid ionomer film from the microporous film. The ethylene-methacrylic acid ionomer film tore with some transfer of the image from the microporous film to the ethylene-methacrylic acid ionomer film. This destroyed the image integrity and indicated good adhesion between the microporous film and the ethylene-methacrylic acid ionomer film.

Example 10

A sheet of ethylene-methacrylic acid ionomer (SURLYN 1707 available from E.I. DuPont de Nemours and Company of Wilmington, Del.) was microembossed with a pattern. The pattern comprised an array of 40 micrometer deep square wells that were surrounded by walls which were 31.2 micrometers thick at their base and 20 micrometers thick at their top surface. The center to center spacing of the walls was 125.0 micrometers.

The ionomer sheet was pressed against an embossing tool containing the inverse of the desired pattern in a compression molding press. The embossing tool was comprised of SILASTIC J. (SILASTIC J is a silicone elastomer available from Dow Corning Co. of Midland, Mich.) The press utilized was a Wabash model 20-122TM2WCB press from Wabash MPI of Wabash, Ind. The temperature of the platens was 150° C. A pressure of about 2.9 MPa was applied for about five minutes. The load was applied for an additional 5–10 minutes while the platens were cooled to about 49° C. The platens were then opened and the embossed film was removed from the embossing tool.

An ink receptor solution was prepared by combining the materials listed in the table below:

| wt % | MATERIAL |
|---|---|
| 12 | crosslinked poly(vinylpyrrolidone) particles (POLYPLASDONE INF-10 available from International Specialty Products of Wayne New Jersey) |
| 8 | ethylene-vinyl acetate polymer latex binder emulsion (AIRFLEX 426 available from Air Products and Chemicals of Allentown, Pennsylvania) |
| 40 | Water |
| 40 | IPA |

This ink receptor composition was coated onto the microembossed surface of the ionomer film using a #10 Meyer rod (nominal wet thickness=0.023 mm) and dried in a convection oven at about 70° C. The coated-microembossed surface was then imaged using a HP2000C inkjet printer equipped with aqueous inks using the premium inkjet paper/best quality settings.

The imaged film was placed on the substrate tie layer composite prepared as described in example 7 above with the imaged side of the imaged film facing the tie layer of the substrate tie layer composite. The construction was laminated using a TLC Model 5560 thermal laminator with an interface temperature of about 145° C. The image quality was unchanged after laminating.

An attempt was made to separate the imaged-microembossed film from the substrate/tie layer composite. The imaged-microembossed film tore and/or stretched with some image transfer to the substrate/tie layer composite destroying the image integrity and indicating that there was good interfacial adhesion between the imaged-microembossed film and the substrate/tie layer composite.

Example 11

A sheet of ethylene-methacrylic acid ionomer (SURLYN 1707 available from E.I. DuPont de Nemours and Company of Wilmington, Del.) was microembossed with a pattern. The pattern comprised an array of 40 micrometer deep square wells that were surrounded by walls which were 31.2 micrometers thick at their base and 20 micrometers thick at their top surface. The center to center spacing of the walls was 125.0 micrometers.

The ionomer sheet was pressed against an embossing tool containing the inverse of the desired pattern in a compression molding press. The embossing tool was comprised of SILASTIC J. (SILASTIC J is a silicone elastomer available from Dow Corning Co. of Midland, Mich.) The press utilized was a Wabash model 20-122TM2WCB press from Wabash MPI of Wabash, Ind. The temperature of the platens was 150° C. A pressure of about 2.9 MPa was applied for about five minutes. The load was applied for an additional 5–10 minutes while the platens were cooled to about 49° C. The platens were then opened and the embossed film was removed from the embossing tool.

An ink receptor solution was prepared by combining the materials listed in the table below:

| wt % | MATERIAL |
|---|---|
| 12 | crosslinked poly(vinylpyrrolidone) particles (POLYPLASDONE INF-10 available from International Specialty Products of Wayne New Jersey) |
| 8 | ethylene-vinyl acetate polymer latex binder emulsion (AIRFLEX 426 available from Air Products and Chemicals of Allentown, Pennsylvania) |

-continued

| wt % | MATERIAL |
|---|---|
| 40 | Water |
| 40 | IPA |

This ink receptor composition was coated onto the microembossed surface of the ionomer film using a #10 Meyer rod (nominal wet thickness=0.023 mm) and dried in a convection oven at about 70° C. The coated-microembossed surface was then imaged using a HP2000C inkjet printer equipped with aqueous inks using the premium inkjet paper/best quality settings.

The imaged film was placed on the substrate tie layer composite prepared as described in example 8 above with the imaged side of the imaged film facing the tie layer of the substrate tie layer composite. The construction was laminated using a TLC Model 5560 thermal laminator with an interface temperature of about 145° C. The image quality was unchanged after laminating.

An attempt was made to separate the imaged-microembossed film from the substrate/tie layer composite. The imaged-microembossed film tore and/or stretched with some image transfer to the substrate/tie layer composite destroying the image integrity and indicating that there was good interfacial adhesion between the imaged-microembossed film and the substrate/tie layer composite.

Example 12

A sheet of ethylene-methacrylic acid ionomer (SURLYN 1707 available from E.I. DuPont de Nemours and Company of Wilmington, Del.) was microembossed with a pattern. The pattern comprised an array of 40 micrometer deep square wells that were surrounded by walls which were 31.2 micrometers thick at their base and 20 micrometers thick at their top surface. The center to center spacing of the walls was 125.0 micrometers.

The ionomer sheet was pressed against an embossing tool containing the inverse of the desired pattern in a compression molding press. The embossing tool was comprised of SILASTIC J. (SILASTIC J is a silicone elastomer available from Dow Corning Co. of Midland, Mich.) The press utilized was a Wabash model 20-122TM2WCB press from Wabash MPI of Wabash, Ind. The temperature of the platens was 150° C. A pressure of about 2.9 MPa was applied for about five minutes. The load was applied for an additional 5–10 minutes while the platens were cooled to about 49° C. The platens were then opened and the embossed film was removed from the embossing tool.

An ink receptor solution was prepared by combining the materials listed in the table below:

| wt % | MATERIAL |
|---|---|
| 12 | crosslinked poly(vinylpyrrolidone) particles (POLYPLASDONE INF-10 available from International Specialty Products of Wayne New Jersey) |
| 8 | ethylene-vinyl acetate polymer latex binder emulsion (AIRFLEX 426 available from Air Products and Chemicals of Allentown, Pennsylvania) |
| 40 | Water |
| 40 | IPA |

This ink receptor composition was coated onto the microembossed surface of the ionomer film using a #10 Meyer rod (nominal wet thickness=0.023 mm) and dried in a convection oven at about 70° C. The coated-microembossed surface was then imaged using a HP2000C inkjet printer equipped with aqueous inks using the premium inkjet paper/best quality settings.

The imaged film was placed on the substrate tie layer composite prepared as described in example 9 above with the imaged side of the imaged film facing the tie layer of the substrate tie layer composite. The construction was laminated using a TLC Model 5560 thermal laminator with an interface temperature of about 145° C. The image quality was unchanged after laminating.

An attempt was made to separate the imaged-microembossed film from the substrate/tie layer composite. The imaged-microembossed film tore and/or stretched with some image transfer to the substrate/tie layer composite destroying the image integrity and indicating that there was good interfacial adhesion between the imaged-microembossed film and the substrate/tie layer composite.

Having thus described the preferred embodiments of the present invention, those of skill in the art will readily appreciate that yet other embodiments may be made and used within the scope of the claims hereto attached. Numerous advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The invention's scope is, of course, defined in the language in which the appended claims are expressed.

What is claimed is:

1. An image retaining card, comprising:
    a cover defining a first surface and a plurality of projections extending beyond the first surface, the projections defining a second surface of the cover;
    an image receptive material disposed on the first surface of the cover, the image receptive material being disposed between the projections; and
    a substrate structure comprising polyolefin or copolymers thereof overlaying the second surface of the cover.

2. The image retaining card of claim 1, wherein the substrate comprises polypropylene or copolymers thereof.

3. The image retaining card of claim 1, wherein one or more surfaces of the substrate are functionalized.

4. The image retaining card of claim 1, wherein the substrate structure further includes a substrate tie layer and a substrate base layer.

5. The image retaining card of claim 1, wherein the substrate structure further includes a substrate tie layer comprising a tie material and a substrate base layer comprising the tie material blended with polyolefin or copolymers thereof.

6. The image retaining card of claim 1, wherein the cover is optically transparent.

7. The image retaining card of claim 1, further including a printed image disposed proximate the image receptive material.

8. The image retaining card of claim 1, further including a printed image comprising aqueous ink disposed proximate the image receptive material.

9. The image retaining card of claim 1, further including a printed image disposed proximate the image receptive material;
    the printed image comprising aqueous ink adapted for use in an inkjet printer.

10. The image retaining card of claim 1, wherein the image receptive material comprises alumina.

11. The image retaining card of claim 1, wherein the image receptive material comprises silica.

12. The image retaining card of claim 1, wherein the image receptive material comprises poly(vinyl alcohol).

13. The image retaining card of claim 1, wherein the image receptive material comprises poly(N-vinylpyrrolidone).

14. The image retaining card of claim 1, wherein the image receptive material comprises hydroxymethyl cellulose.

15. The image retaining card of claim 1, wherein the image receptive material comprises poly(N-vinylimidazole).

16. The image retaining card of claim 1, wherein the image receptive material comprises poly(N-vinyllactams).

17. The image retaining card of claim 1, wherein the image receptive material comprises poly(N-vinycaprolactam).

18. The image retaining card of claim 1, wherein the cover comprises an ethylene-methacrylic acid ionomer.

* * * * *

UNITED STATES PATENT AND TRADEMARK OFFICE
CERTIFICATE OF CORRECTION

PATENT NO. : 6,905,742 B2
DATED : June 14, 2005
INVENTOR(S) : Koneripalli, Nagraj It is certified that error appears in the above-identified patent and that said Letters Patent is hereby corrected as shown below:

Column 6,
Line 13, delete "quatenary" and insert -- quaternary --, therefor.

Column 13,
Line 32, delete "ethylene-co-metbacrylic" and insert -- ethylene-co-methacrylic --, therefor.
Line 40, delete "copolyers" and insert -- copolymers --, therefor.

Column 14,
Line 37, after "-218° C." (third occurrence) insert -- -218° C. --.

Column 15,
Line 42, after "bonded" delete ",".

Column 17,
Line 1, after "PRO-FAX" delete ",".

Column 19,
Line 35, delete "Nemrours" and insert -- Nemours --, therefor.

Column 23,
Line 45, after "ionomer" delete ".".

Signed and Sealed this

Twenty-third Day of August, 2005

JON W. DUDAS
*Director of the United States Patent and Trademark Office*